(12) United States Patent
Stevens et al.

(10) Patent No.: US 12,107,434 B2
(45) Date of Patent: Oct. 1, 2024

(54) MAGNETOINDUCTIVE WAVE CONTROL

(71) Applicant: METABOARDS LIMITED, Oxford (GB)

(72) Inventors: Christopher John Stevens, Oxford (GB); Ekaterina Shamonina, London (GB); Irina Khromova, Oxford (GB)

(73) Assignee: METABOARDS HOLDINGS LTD, Iver (GB)

( * ) Notice: Subject to any disclaimer, the term of this patent is extended or adjusted under 35 U.S.C. 154(b) by 16 days.

(21) Appl. No.: 17/740,886

(22) Filed: May 10, 2022

(65) Prior Publication Data

US 2022/0271566 A1    Aug. 25, 2022

Related U.S. Application Data

(63) Continuation of application No. 16/621,476, filed as application No. PCT/GB2018/051640 on Jun. 14, 2018, now abandoned.

(30) Foreign Application Priority Data

Jun. 16, 2017 (GB) .................................. 1709627
Nov. 20, 2017 (GB) .................................. 1719246

(51) Int. Cl.
*H02J 50/12*     (2016.01)
*H01F 1/01*      (2006.01)
(Continued)

(52) U.S. Cl.
CPC ............... *H02J 50/12* (2016.02); *H01F 1/01* (2013.01); *H01P 1/20381* (2013.01);
(Continued)

(58) Field of Classification Search
CPC .. H02J 50/12; H02J 50/80; H01F 1/01; H01P 1/20381; H01P 7/082
(Continued)

(56) References Cited

U.S. PATENT DOCUMENTS 5,003,265 A    3/1991   Leussler
7,741,933 B2   6/2010   Duwel et al.
(Continued)

FOREIGN PATENT DOCUMENTS

CN    102804541 A    11/2012
CN    102971940 A    3/2013
(Continued)

OTHER PUBLICATIONS

International Search Report and Written Opinion in corresponding International Patent Application No. PCT/GB2019/053672 dated Apr. 15, 2020.
(Continued)

*Primary Examiner* — Alfonso Perez Borroto
(74) *Attorney, Agent, or Firm* — Lando & Anastasi, LLP

(57) ABSTRACT

A method of configuring a metamaterial structure comprising a plurality of electrical resonators (110) that support magnetoinductive waves is disclosed. The method comprises: powering at least one of the electrical resonators (110) with an alternating current at an excitation frequency, the at least one powered electrical resonator providing a source of magnetoinductive waves in the structure; adjusting parameters of the metamaterial structure to create constructive interference of one- two- or three-dimensional magnetoinductive waves at one or more target resonators of the electrical resonators (110), to improve power transfer from the at least one powered electrical resonator to the one or more target resonators (110).

18 Claims, 27 Drawing Sheets

(51) Int. Cl.
*H01P 1/203* (2006.01)
*H01P 7/08* (2006.01)
*H02J 50/40* (2016.01)
*H02J 50/50* (2016.01)
*H02J 50/80* (2016.01)
*H02J 50/90* (2016.01)
*H02J 7/00* (2006.01)

(52) U.S. Cl.
CPC .............. *H01P 7/082* (2013.01); *H02J 50/40* (2016.02); *H02J 50/402* (2020.01); *H02J 50/50* (2016.02); *H02J 50/80* (2016.02); *H02J 50/90* (2016.02); *H02J 7/0042* (2013.01)

(58) Field of Classification Search
USPC ........................................................ 307/104
See application file for complete search history.

(56) References Cited

U.S. PATENT DOCUMENTS

| | | | |
|---|---|---|---|
| 8,912,973 | B2 | 12/2014 | Werner et al. |
| 9,385,785 | B2 | 7/2016 | Edwards et al. |
| 10,848,003 | B2 | 11/2020 | Ng et al. |
| 10,931,252 | B2 | 2/2021 | Stevens et al. |
| 2010/0259217 | A1 | 10/2010 | Baarman et al. |
| 2010/0301971 | A1 | 12/2010 | Yonak et al. |
| 2012/0161539 | A1* | 6/2012 | Kim .................. H02J 50/12 307/104 |
| 2012/0231731 | A1* | 9/2012 | Kim .................. H02J 50/80 307/104 |
| 2012/0244822 | A1* | 9/2012 | Kim .................. H02J 50/402 307/104 |
| 2012/0280575 | A1* | 11/2012 | Kim .................. H02J 7/00047 307/104 |
| 2012/0286582 | A1* | 11/2012 | Kim .................. H02J 50/90 307/104 |
| 2012/0293005 | A1* | 11/2012 | Ryu .................. B60L 53/36 307/104 |
| 2014/0028112 | A1 | 1/2014 | Hui et al. |
| 2015/0123491 | A1* | 5/2015 | Kim .................. G01R 23/04 307/104 |
| 2016/0099579 | A1* | 4/2016 | Kim .................. H02J 7/02 307/104 |
| 2016/0190851 | A1 | 6/2016 | Pudipeddi et al. |
| 2016/0294223 | A1* | 10/2016 | Kim .................. H02J 50/12 |
| 2017/0331332 | A1 | 11/2017 | Lee et al. |
| 2018/0013310 | A1 | 1/2018 | Moussaoui et al. |

FOREIGN PATENT DOCUMENTS

| | | |
|---|---|---|
| WO | 2012037279 A1 | 3/2012 |
| WO | 2012172371 A1 | 12/2012 |
| WO | 2013108325 A1 | 7/2013 |
| WO | 2015033168 A1 | 3/2015 |
| WO | 2018229494 A1 | 12/2018 |

OTHER PUBLICATIONS

International Search Report in corresponding International Patent Application No. PCT/GB2018/051640 dated Aug. 14, 2018.
Office Action in corresponding Chinese Patent Application No. 201980084597.3 dated Dec. 23, 2021.
Search Report under Section 17 in corresponding United Kingdom Patent Application No. GB1820840.5 dated Jun. 3, 2019.

* cited by examiner

MAGNETOINDUCTIVE WAVE CONTROL

CROSS-REFERENCE TO RELATED APPLICATIONS

This application claims priority under 35 U.S.C. § 120 as a continuation of U.S. patent application Ser. No. 16/621,476, titled MAGNETOINDUCTIVE WAVE CONTROL, filed Dec. 11, 2019, which is a U.S. National Stage Application and claims the benefit under 35 U.S.C. § 371 of PCT/GB2018/051640, titled MAGNETOINDUCTIVE WAVE CONTROL, filed Jun. 14, 2018, which claims priority to United Kingdom Application No. GB 1719246.9, filed Nov. 20, 2017, and United Kingdom Application No. GB 1709627.2, filed Jun. 16, 2017, which patent applications are all hereby incorporated herein by reference in their entireties for all purposes.

The present application relates to a method of controlling magnetoinductive waves, and apparatus configured to control magnetoinductive waves.

It would be convenient to be able to provide power to electronic devices without the need for a wired connection to a fixed power supply. The rapid growth of autonomous devices, such as mobile phones, tablets, laptops, household robots means that such technology is more relevant than ever. Most such autonomous devices are presently battery powered, and charging is often inconvenient. There are significant implications with large batteries, which impact cost and device weight, and which increase device size. A more convenient way of providing electrical power to devices would mitigate the need for large batteries, by improving the ease with which a device can be kept topped-up with charge.

Furthermore, wired connections are potentially clumsy, and require manipulation of a connector fitted to the cable in order to electrically connect a device to a power supply.

Power and connectors are furthermore notorious points of failure for electronic devices, either simply as a result of repeated cycles of connection and disconnection, or as a result of a trip or similar accident imposing a mechanical load on the connector via the cable.

A significant amount of research and development has been undertaken in wireless power transfer. A number of standards exist for wireless power supply, including Rezence and Qi. Both systems employ a powered coil in a power transmission unit, and a further receiver coil in the device to be wirelessly powered. Qi systems have a relatively short range, and require relatively close proximity (e.g. 5 mm) inductive coupling between the powered coil and receiver coil.

In Rezence systems a resonant inductive coupling between the powered coil and receiver coil is used to transfer power to the target device. The resonant coupling between the powered coil and receiver coil means that power can be transmitted over a greater distance.

EP2617120 discloses wireless energy transfer systems in which repeater resonators are used to transfer power from a source resonator to a target area. At least one of the repeater resonators is detuned according to a routing algorithm.

Although considerable progress in developing wireless power transfer has been made, considerable room for improvement exists.

SUMMARY OF INVENTION

According to a first aspect, there is provided a method of transferring power through a metamaterial structure comprising configuring a metamaterial structure comprising a plurality of electrical resonators that support magnetoinductive waves to wirelessly transmit power to a receiver located adjacent to one or more target resonators of the metamaterial structure, the method comprising:

feeding the structure by powering at least one of the electrical resonators with an alternating current;

adjusting parameters of the metamaterial structure to create constructive interference magnetoinductive waves (MIWs) at the one or more target resonators of the electrical resonators, to improve power transfer from at least one powered electrical resonator to the one or more target resonators.

According to a second aspect, there is provided an apparatus comprising:

a plurality of electrical resonators that are configurable to form a metamaterial structure which supports magnetoinductive waves;

a power source for powering at least one of the electrical resonators with an alternating current at an excitation frequency, so that the at least one powered electrical resonator provides a source of magnetoinductive waves in the structure;

a system controller configured to adjust at least one of the electrical resonators to create constructive interference of two or three dimensional magnetoinductive waves at one or more target resonators of the electrical resonators, to improve power transfer from the powered at least one electrical resonator to the one or more target electrical resonators.

The optional features described below are equally applicable to the first and second aspect. The system controller and apparatus may be configured to perform optional features of the method. The method may utilise a specific apparatus with any of the features recited below.

Adjusting parameters may comprise adjusting parameters of the metamaterial structure to create constructive interference of one two or three dimensional magnetoinductive waves at the target resonator.

The plurality of resonators may support dispersive magnetoinductive waves.

There may be a plurality of target resonators, and improving power transfer may comprise increasing the uniformity of current intensity in the target resonators. Reference to a target resonator does not exclude the possibility of there being more than one target resonator, for instance corresponding with more than one target device in different locations. Statements referring to a target resonator may also apply to target resonators (mutatis mutandis).

The metamaterial structure may comprise an array or lattice of resonators.

The electrical resonators may be provided on a plurality of substrates or tiles. Each electrical resonator may be provided on a separate tile. Each tile may be a printed circuit board. In other embodiments, more than one of the resonators may be disposed on a single tile (e.g. some tiles may include two or more resonators).

The electrical resonators may be placed next to each other in an array or lattice (the lattice or array may be two dimensional or three dimensional). Adjusting at least one of the electrical resonators may comprise removing one of the resonators from the array or lattice, leaving a defect. The method may comprise forming the metamaterial structure by placing substrates comprising the resonators side-by-side. Placing at least some of the substrates side-by-side may comprise placing some (or all) of the substrates with at least one edge in contact with a neighbouring substrate.

A set of electrical resonators can be configured as the metamaterial structure capable of supporting magnetoinductive waves by placing the resonators in a two-dimensional or three-dimensional array or lattice, where adjacent resonators have a coupling coefficient (defined as the ratio of mutual inductance and the geometric mean of the self-inductance of the adjacent resonators) of at least 0.01 and a Q factor of at least 20. More preferably the coupling coefficient is at least 0.05 and the Q factor is at least 100.

Each of the plurality of substrates may have the same shape (e.g. rectangular or square). This facilitates straightforward tiling/tessellation of the elements into an array. Each substrate (and/or each electrical resonator) may have a polygonal shape, such as triangular, square, rectangular, pentagonal, hexagonal etc. Polygons with fewer sides may have increased inductive coupling with each neighbouring resonator. A mixture of different shapes may be used in the system.

Powering at least one of the electrical resonators may comprise injecting current directly into the powered at least one electrical resonator via a direct electrical connection, and/or exciting a current in the powered at least one electrical resonator inductively (e.g. by resonant and/or inductive power transfer).

The metamaterial structure may be configured to support MIWs with a frequency that is near to a nominal resonant frequency (e.g. within 5%, or 10%) of each of the electrical resonators (excluding any electrical resonators that are configured as defects).

Parameters of the metamaterial includes geometrical and/or electrical/electromagnetic parameters. Adjusting parameters of the metamaterial structure may comprise one or more of: adjusting one or more of the resonators in the metamaterial structure; creating one or more lattice defect in the metamaterial structure from which MIWs are scattered and/or reflected.

The defects may be temporally periodic (e.g. in addition to being spatially periodic). The defects may be configured to produce a checkerboard pattern of alternating high and low currents in a region of the electrical resonators of the structure. The method may comprise switching from a first configuration of defects with a first checkerboard pattern of high current resonators, and a second configuration of defects with a second pattern that is substantially an inverted version of the first pattern (with, for a majority of the resonators that are not configured as defects, low current resonators where there were previously high current resonators, and high current resonators where there were previously low current resonators).

The defects in the metamaterial structure may comprise electrical resonators at that are: not present, detuned, or switched off. A switched off electrical resonator may be one with electrical properties that are significantly different to the electrical resonators that do not comprise defects in the material, for instance having an electrical impedance that is at least twice as high at the system frequency, a Q that is at least twice as low, and/or a resonant frequency that differs from the system frequency by at least 10%.

The system frequency may be a nominal resonant frequency of each electrical resonator (e.g. in the on state).

The method may comprise placing a defect on a symmetry axis/plane of the Brillouin scattering zone of the metamaterial structure to reflect and/or scatter a beam formed along the symmetry axis/plane.

The metamaterial structure may approximate a square 2D array, and the method may comprise placing a defect on a diagonal from a powered electrical resonator.

The method may comprise placing a pattern of defects along at least one edge of the array to create a specific standing wave pattern over the structure. The standing wave pattern may approximate a checkerboard pattern of alternating high and low current intensity over a region of the structure.

The pattern of defects along at least one edge comprise may comprise defects in each corner of the structure. More generally, defects may be placed perpendicular to at least one symmetry axis (or on each axis) of the Brillouin scattering zone of the lattice—for a square lattice, this corresponds to a triangular blocking element in each corner, since the Brillouin scattering symmetry axes are diagonal. For a triangular lattice, six blocking regions may be advantageous.

The defects in each corner may together form triangular shapes in each corner.

Creating one or more defect in the structure may comprise creating a plurality of lambda-periodic defects in that have a spatial period in at least one direction corresponding with a wavelength of the MIWs from the at least one powered electrical resonator. Note that the wavelength of the MIW is not the same as the wavelength of an electromagnetic wave of the same frequency propagating in space. The wavelength is defined by the propagation of the excitation current through the resonators of the metamaterial.

The lambda-periodic defects may comprise, or consist entirely of, features at edge regions of the structure.

The lambda-periodic defects may comprise a lambda-grid of defects across a region, or all of, the array. For a lattice comprising a square array, the lambda grid may comprise a defect at every fifth resonator element.

Creating one or more defect in the array may comprise creating a defect at every second electrical resonator along the edges of the array.

Adjusting at least one of the electrical resonators may comprise adjusting an effective impedance of the at least one electrical resonator.

At least one of the electrical resonators may be a controllable resonator that comprises part of a controllable element, the controllable element further comprising a control device.

Creating one or more defects in the metamaterial structure may comprise using a control signal to switch the controllable resonator from an on state to an off state.

The controllable resonator may have a first resonant frequency in the on state and a first impedance at the resonant frequency in the on state, and in the off state a second impedance at the first resonant frequency that is at least 10 times less than the first impedance. In the off state the controllable resonator may not have a resonant frequency that is within 5% of the first resonant frequency. In the off state the controllable resonator may not have a resonant frequency that is within 50% of the first resonant frequency. In the off state the controllable resonator may have a resonant frequency that is at least 1.5 times the first resonant frequency, preferably at least 2 times the first resonant frequency. It has been found experimentally that this provides effective control. For example, for a nominal (first) frequency of 6.78 MHz, it was found that the effectiveness of control is reduced if the second resonant frequency is less that 15 MHz.

The controllable resonator may comprise a primary resonator, and the control device may further comprise an active control component that is configured to adjust the effective impedance of the primary resonator in response to a control signal.

The control device may comprise a secondary resonator, inductively coupled to the primary resonator, the active control component configured to vary the electrical properties of the secondary resonator in response to the control signal.

The coupling between the controllable resonator and secondary resonator may mean that the coupled system will have two modes: a first mode in which the currents in the primary and secondary resonator are in phase, and a second mode in which the currents in the primary and secondary resonator are out of phase.

The secondary resonator may be operable in the off state to cause an anti-resonance in the system of the primary resonator and secondary resonator at the resonant frequency of the primary resonator.

Adjusting parameters may comprise communicating the control signal.

The system controller may be configured to provide the control signal wirelessly.

The control signal may be communicated by an in-band communication channel that propagates as a modulated MIW through the structure.

The system controller may be configured to provide the wireless control signal by an in-band wireless communication signal that propagates as a modulated MIW through the structure. The system controller may be configured to provide the wireless communication signal out-of-band, for example via Bluetooth or Zigbee. The system controller may comprise a modem for transmitting and receiving wireless signals (in-band or out-of-band). At least one (or each) of the electrical resonators may be provided with a receiver for receiving control signals from the system controller and/or a transmitter (or a modem with Tx/Rx functionality) for transmitting information about the status of the resonator (e.g. current flow) to the system controller.

The method may comprise locating the target resonator by determining which electrical resonator has the best coupling to a target device placed in proximity to the structure.

At least one or each of the electrical resonators may be provided with a current sensor for detecting current flow in the electrical resonator. The current sensor may comprise a Hall sensor.

Locating the target resonator may comprise:
establishing a communication channel between a system controller and the target device;
receiving information from the target device about whether the target device is receiving power from the structure;
conducting a search for the target device by adjusting the parameters of the structure to vary the distribution of current therein, while monitoring the received power at the target device.

For example, half of the electrical resonators could be placed in an 'off' state, and half in an 'on' state. If the target device is receiving power from the structure in this configuration, the target resonator is in the set of devices that were placed in the 'on' state. A binary search for the target device can be conducted using this approach.

Alternatively (or additionally), electrical characteristics (e.g. the input impedance, or reflection properties) of the at least one powered electrical resonator may be monitored in order to locate the target device.

The method may comprise using a model to simulate the propagation of MIWs in the structure to determine how to adjust the parameters of the metamaterial structure to improve power transfer.

The system controller may comprise a model that simulates the propagation of MIWs in the structure. Once the target resonator has been identified, the system controller may use the model to determine how to increase current flow at the target resonator.

The system controller may select an appropriate method for achieving this from those disclosed herein.

Adjusting the parameters of the metamaterial structure may comprise adjusting a location and/or phase of a further powered electrical resonator, wherein the location and or/phase of the further powered electrical resonator is selected to provide constructive interference at the one or more target resonator.

Adjusting the parameters of the material structure may comprise adjusting the frequency of the alternating current.

The phase of the at least one powered electrical resonator and the further powered electrical resonator may be different.

The adjusting at least one of the electrical resonators may be periodic, to create successive patterns of standing waves that increase the average uniformity of current flow through the target resonators.

Improving power transfer may comprise at least one of:
i) increasing current intensity in the one or more target resonators;
ii) improving the efficiency of power transfer between the at least one powered electrical resonator and the one or more target resonators;
ii) where there is more than one target resonator, improving the uniformity of current intensity in the target resonators and/or increasing the average current intensity in the target resonators.

According to a third aspect, there is provided a metamaterial structure comprising a plurality of electrical resonators that support magnetoinductive waves, wherein the electrical resonators comprise a first resonator type and a second resonator type arranged in an alternating pattern, the first resonator type having a larger extent than the second resonator type, and the wherein the structure is configured and excited with an alternating electrical current at one or more of the resonators to produce a current distribution in the structure with an the intensity pattern corresponding with a checkerboard, wherein the resonators of the first type are high current resonators, and the resonators of the second type are low current resonators.

The plurality of resonators may support dispersive magnetoinductive waves.

The resonators may be arranged in an array with a square or rectangular unit cell. The second resonators may be placed in the interstices of the first resonators.

The first resonator type may be octahedral, and the second resonator type may be square.

The first and second resonators may have the same nominal resonant frequency.

According to a fourth aspect of the invention, there is provided a system for wireless power communication, comprising a plurality of elements, including:
an input element comprising an electrical resonator for receiving power from a power supply,
a plurality of power transfer elements, each comprising an electrical resonator for transmitting power by electromagnetic induction to a target device,
wherein the plurality of elements are provided on at least one substrate, and the electrical resonators of the plurality of elements are configured to form a medium supporting magnetoinductive waves capable of providing wireless power to a target device in proximity with any of a plurality of the power transfer elements.

The system according to the first or third aspect may be provided with the features of the fourth aspect. The plurality of electrical resonators of the first, second or third aspect may be provided in the power transfer elements of the fourth aspect.

Features described with reference to the fourth aspect are applicable to the first and second aspect of the invention. For example, the features of the control device that are described in relation to the fourth invention are applicable, in isolation of the other features of the fourth aspect (such as elements being disposed on different substrates), to the first and second aspect.

The plurality of elements may be provided on at least two, or at least three substrates (or tiles). For example, each power transfer element may be provided on a separate substrate (or tile).

Where the system comprises a plurality of separate substrates, the system may be operable to provide wireless power to a target device brought into proximity with a power transfer elements (or any of the power transfer elements) once the substrates are brought into proximity to form the medium.

The input element may be configured to receive power by electromagnetic induction. In other embodiments the input element may be provided with an electrical connector for receiving a wired DC or AC power input (e.g. 2.4V, 5V, 7.2V, 12V, or 110V, 230V, 240V etc).

Each of the plurality of elements may be provided on a separate substrate, such as a printed circuit board (PCB).

The substrate may be flexible (e.g. polyimide/kapton) or rigid (e.g. fibre reinforced composite/FR4). In some embodiments, more than one element may be provided on a single substrate. For example, a substrate may comprise two, three or more power transfer elements, or a substrate may comprise one or more power transfer element with the/an input element.

The electrical resonator of each of the plurality of elements may have a Q of between 50 and 500 (as measured when disconnected from a power supply or load).

Configuring the system to form a medium supporting magnetoinductive waves may comprise placing at least some (or all) of the substrates next to each other.

The electrical resonator of each element (input, output, intermediate) may comprise at least one conducting loop and at least one capacitor (e.g. a split-ring type electrical resonator). The conducting loop may follow the edge of the substrate, having the same shape as the substrate.

When the system is configured to form a medium supporting magnetoinductive waves, the coupling coefficient between the resonators of adjacent elements may be at least 0.025 (where the coupling coefficient is defined as the ratio of mutual inductance between adjacent electrical resonators and the geometric mean of the self-inductance of each of the adjacent electrical resonators), or at least 0.05, 0.1, or 0.2.

The input element may receive power from a Rezence/Air Fuel compliant power transmitter unit. Each power transfer element may be operable to provide power to a Rezence/Air Fuel compliant power receiver unit.

The resonant frequency of the electrical resonator of each of the plurality of elements may be between 6 and 7 MHz (e.g. 6.78 MHz). The resonant frequency of the electrical resonator of each element may be nominally equal to a design frequency of the system.

The operating bandwidth may be at least 20% of the resonant frequency.

The width and length of each of the elements may be between 5 cm and 20 cm.

At least one of the plurality of elements may be controllable elements which further comprise a control device. The electrical resonator of each controllable element may be a primary resonator, and the control device may further comprise an active control component that is configured to adjust the impedance of the primary resonator of the controllable element in response to a control signal.

The control device may be operable to adjust the impedance of the primary resonator at a design frequency. The control device may be operable to adjust the impedance over a range of frequencies (i.e. to adjust the frequency response of the primary resonator).

The control device may be inductively coupled to the primary resonator. The control device may be conductively and/or capacitively coupled to the primary resonator. The control device may comprise an active control component that is conductively or capacitively coupled to the primary resonator and an active control component that is inductively coupled to the primary resonator (e.g. in a secondary resonator)

The control device may comprise a secondary resonator, inductively coupled to the primary resonator. The active control component may be arranged to vary the electrical properties of the secondary resonator in response to the control signal.

The coupling between the first and second resonator means that the coupled system will have two modes: a first mode in which the currents in the primary and secondary resonator are in phase, and a second mode in which the currents in the primary and secondary resonator are out of phase. The secondary resonator may be operable to cause an anti-resonance in the impedance of the primary resonator at the resonant frequency of the uncoupled secondary resonator. Using an active control component to change the properties of the secondary resonator may result in a change in the modes of the coupled system, thereby changing the effective impedance of the primary resonator (e.g. at the design frequency).

The secondary resonator may comprise a capacitor, and the active control component may be arranged in series with the capacitor.

The secondary resonator may comprise a capacitor, and the active control component may be arranged in parallel with the capacitor.

The secondary resonator may have a resonant frequency that is matched to a resonant frequency of the primary resonator to within 1%, 2%, 5%, or 10%.

The control device may comprise an inductor and the active control component may be in series with the inductor and operable to vary the effective resistance of the control device in response to the control signal.

The control device may comprise an inductor, and the active control component may be in parallel with the inductor and operable to vary the effective inductance of the control device in response to the control signal.

The control device may comprise a further active control component in parallel with the inductor, and the control device may be operable to vary the effective inductance of the control device in response to the control signal.

The active control component may be conductively coupled to the primary resonator.

The active control component may comprise a transistor, such as a MOSFET.

The active control component may comprise a variable capacitor, arranged to vary a resonant frequency of the primary resonator (e.g. by varying the capacitance of the primary resonator).

The active control component may be connected in series with a capacitor of the primary resonator, and may be operable to vary the effective resistance of the primary resonator in response to the control signal.

The control device and corresponding primary resonator of the at least one controllable cell may be disposed on different substrates.

The secondary resonator may be substantially concentric with the primary resonator. The secondary resonator may be substantially coplanar with the primary resonator.

The secondary resonator may be offset from the primary resonator in a direction having a component parallel with an axis of the primary conducting loop (e.g. in a direction along the axis).

The control device may be disposed on a different substrate to the primary resonator, and the controllable element may comprise a stacked combination of a substrate on which the primary resonator is disposed, and a substrate on which the secondary resonator is disposed.

The medium may comprise a plurality of controllable elements, arranged in a two-dimensional array. The active control component of each controllable element may be individually addressable, for instance by wireless communication.

At least some of the plurality of elements may comprise a power converter, operable to convert AC electrical power from the electrical resonator to DC power. At least some of the plurality of elements may comprise a controller, powered by the DC power.

The controller may comprise a receiver for receiving data wirelessly from at least one other element of the system.

The receiver may be configured to receive data propagated by modulated magnetoinductive waves propagating through the electrical resonators of the plurality of elements.

Each controllable element (e.g. controllable input element, controllable output element, controllable intermediate element) may comprise a power converter and a controller.

The controller may be configured to provide the control signal (to the control device) in response to the data received wirelessly.

The controller may further comprise a transmitter for transmitting data wirelessly to at least one other element of the system.

The transmitter may be configured to wirelessly transmit data to other elements by modulating magnetoinductive waves propagating through the electrical resonator of the element that includes the transmitter.

The receiver and/or transmitter may be Bluetooth, Zigbee, and/or 802.11 compliant.

Each element may be configured with a unique identification code.

The system may be configured to form an ad-hoc network comprising the elements when the elements are configured to form a medium supporting magnetoinductive waves. The network may be a partial mesh network or a mesh network.

The active control components may be responsive to an electrical signal.

At least one element of the system may further comprise a display device, and the controller may be configured to control the display device In another embodiment, the system may comprise a plurality of target devices, each target device comprising a display device configured to receive wireless power from one of the plurality of elements, and to be controlled by the controller of the element from which the display device receives wireless power.

According to a fifth aspect of the invention, there is provided a display comprising a plurality of elements, including, comprising:
an input element comprising an electrical resonator for receiving power from a power supply,
a plurality of power transfer elements, each comprising an electrical resonator for transmitting power by electromagnetic induction,
wherein the plurality of elements are provided on at least one substrate, and the electrical resonators of the plurality of power transfer elements are configured to form a medium supporting magnetoinductive waves, the medium capable of distributing wireless power to each power transfer element in the system;
wherein at least some of the plurality of elements further comprise:
a power converter, operable to convert AC electrical power from the electrical resonator to DC power; and
a controller, powered by the DC power devices each in proximity with any of the power transfer elements;
a display device controlled by the controller and receiving power from the power converter.

The plurality of elements may be provided on at least two, or at least three substrates, and the medium may be formed when the substrates are brought into proximity.

The controller of this aspect may include any of the controller features described above with reference to the first aspect. Similarly the display device may include any of the display device features described with reference to the first aspect.

The display devices (of any aspect) may be configured to form a composite display device, and the system may further comprise a system controller configured to provide instructions to each display device via the controller of each element powering (or comprising) a display device, so as to display a composite image or video on the composite display device.

At least one element may further comprise a sensor selected from: an image sensor, a vibration sensor, a light sensor, a temperature sensor and a current/voltage sensor.

The system further may further comprise a system controller configured to optimise power transfer through the medium (e.g. to one or more target devices) by varying the impedance of controllable elements.

The input element may comprise the system controller.

The system controller may comprise a model of magnetoinductive wave propagation through the medium, the system controller being configured to use this model to determine which controllable elements should be placed in a high impedance state for optimal power transmission to the target device (or target devices).

DETAILED DESCRIPTION

Embodiments will now be described, purely by way of example, with reference to the accompanying drawings, in which.

Figure 15:
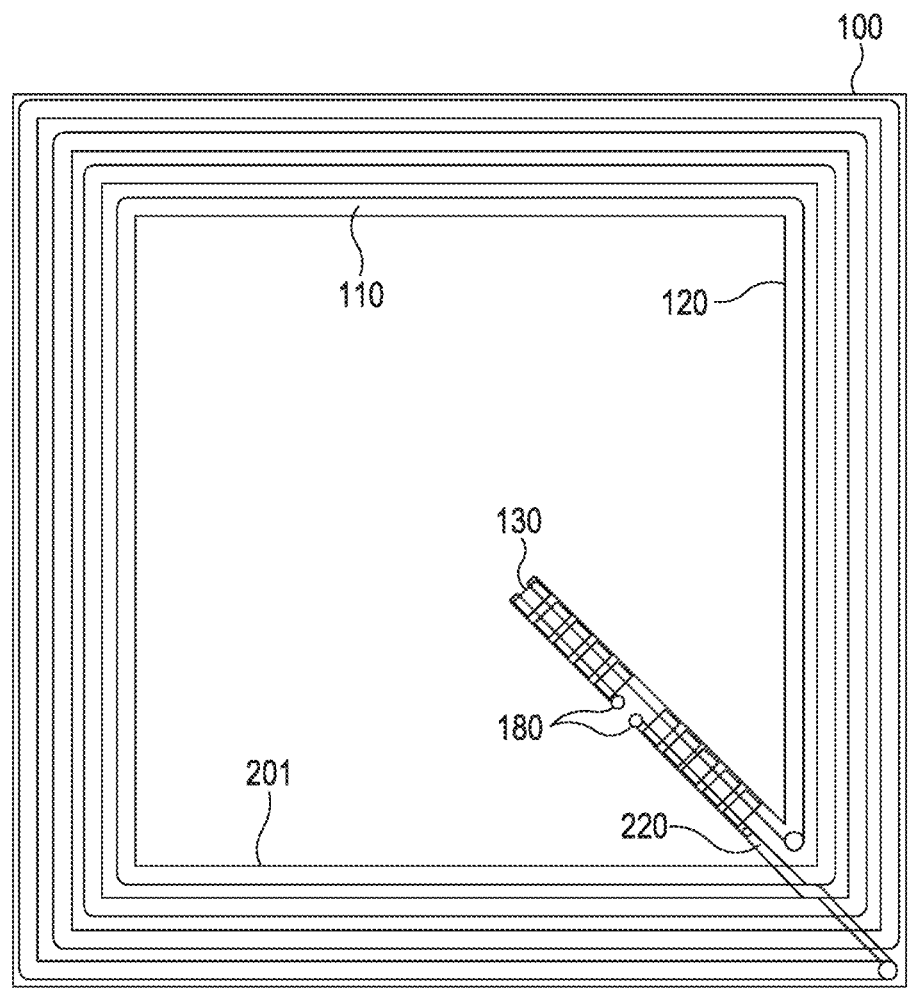
FIG. 15 is a layout diagram of an element comprising an electrical resonator.

FIG. 15 is an example of a square power transfer element 100 for use in some embodiments, including a resonator a 110. The resonator 110 comprises a four turn inductor 120, patterned in a first metal layer. A first end of the inductor is connected to a first electrode of each of a plurality of discrete capacitors 130 (e.g. surface mount capacitors), and the second (opposite) end of the inductor is connected to a second electrode of each of the plurality of discrete capacitors. The capacitors may be selected to tune the resonant frequency of the resonator to the required frequency. A via and a second metal layer may be used to connect the second electrode of each capacitor to the second end of the inductor (with a trace passing under or over the turns of the inductor 120).

Figure 1:
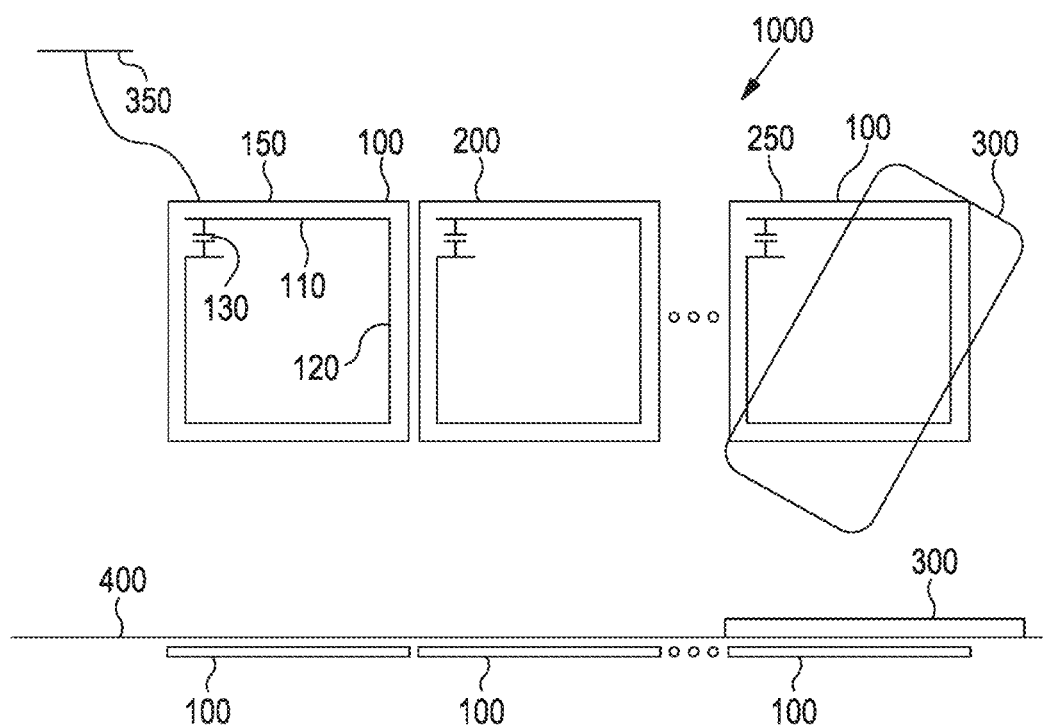
FIG. 1 is a system for wireless power communication comprising a 1D array of power transfer elements, in which current is directly injected at the input element.

Referring to FIG. 1, a system 1000 for wireless power communication is shown, comprising a plurality of elements 100. Each element 100 comprises an electrical resonator 110 comprising a series combination of an inductor 120 (in the form of a conducting loop) and capacitor 130. Each element in the example of FIG. 1 is disposed on a separate substrate or tile, and the tiles are configured such that, when they are placed side-by-side, there is sufficient coupling between the adjacent substrates/tiles to form a medium (or metamaterial) capable of propagating magnetoinductive waves. In order to achieve this, the coupling coefficient (defined as the ratio of mutual inductance between adjacent electrical resonators 110 and the geometric mean of the self-inductance of each of the adjacent electrical resonators 110) between adjacent electrical resonators 110 is at least 0.025. Each resonator 110 may be designed with a resonant frequency that is nominally equal to the system design resonant frequency. A high coupling coefficient between adjacent electrical resonators may be achieved by arranging (i.e. in the layout design of the element) the conducting loop of each inductor 120 close to the edge of its respective tile, for example, within less than 2 mm of the edge. When the edges of the tiles are brought into contact (e.g. so that they abut each other), a sufficiently high degree of coupling may result such that the elements 100 form a medium capable of propagating magnetoinductive waves so as to transmit power to each of the elements 100, thereby enabling any of the elements to provide wireless power to a proximate target device 30.

The coupling is due to the proximity between the conductors of adjacent elements, and resulting near-field magnetic interactions. Contact between the tiles may not be necessary, and the elements 100 may form a medium suitable for propagating magnetoinductive waves when there are gaps between adjacent tiles. In other examples, at least partial overlap of adjacent tiles may be used to increase coupling.

Each of the adjacent elements may have a inductor that is matched with the inductor of each of the other elements (e.g. of the same layout). Each of the resonators may also have a matched capacitance, thereby producing a nominally identical resonant frequency.

Each of the resonators may be designed with a relatively high Q, for example at least 50, at least 100, or at least 200. The Q of a resonator relates to the losses of an oscillating current in the resonator—a greater resistance in the resonator results in higher losses and lower Q. In practice it may be difficult to reduce the effective resistance of the inductor loop. Practical trade offs between competing design parameters may limit the Q to a few hundred for a practical device.

Figure 2:
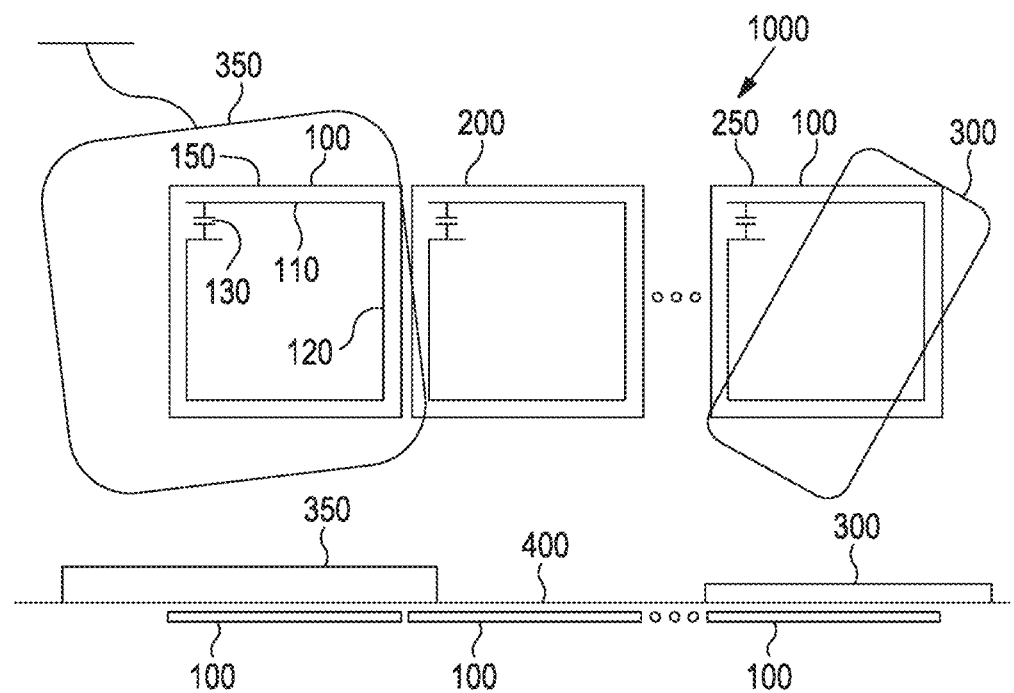
FIG. 2 is a system similar to that of FIG. 1, but in which current is provided wirelessly to the input element.

Power is provided to one of the elements 100 from an external power supply 350. An element 100 that is configured to receive power from the external power supply 350 is termed an input element 150. The input element 150 may comprise a connector for receiving AC or DC power from an external power supply (in a wired connection), as schematically illustrated in FIG. 1. FIG. 2 illustrates an alternative arrangement in which the external power supply 350 provides wireless (inductively coupled) power to the input element 150.

Intermediate elements 200 provide a medium for magnetoinductive waves (and hence power) to be transmitted from the input element 150 to an output element 250. The output element 250 is in proximity with a target device 300, which is itself configured to derive power inductively from the oscillating magnetic field of the output element 250. The output element 250 may be of the same design as the intermediate elements 200—the term output element is merely used to denote an element 100 that is providing power to a target device 300. The electrical resonator of the output element 250 may be termed the target resonator. Intermediate elements 200 and output elements 250 may be thought of a different use cases for the same type of element, which may more generally be referred to as a power transfer element. The magnetoinductive field associated with any elements in the system may be used to power an adjacent target device.

Each power transfer element may be disposed on a separate tile, and each may have nominally identical design (i.e. matched inductance and capacitance, and therefore matched resonant frequency). In the example of FIGS. 1 and 2, a one-dimensional array of power transfer tiles is illustrated, with the ellipsis denoting 'n' further tiles. At the other end of the array, a target device 300 is placed in proximity to the final element 250. The target device 300 in this example may be a mobile phone, but could equally be a laptop, monitor, loudspeaker, lamp, etc. The target device 300 receives power by electromagnetic induction from the final element 250.

An advantage of a system comprising separate tiles that couple sufficiently strongly to form a medium supporting magnetoinductive waves when placed in a 2D array is that such a system can be used to produce a relatively large area surface that can deliver electrical power to compatible wireless devices that are placed more or less anywhere on the surface. This is illustrated in FIGS. 1 and 2, in which the tiles comprising the elements 100 are placed on the underside of a surface 400 (e.g. of a table or desk), such that any target devices 30 placed on the surface 400 can receive wireless power from the element 250 nearest to the device 300.

Figure 3:
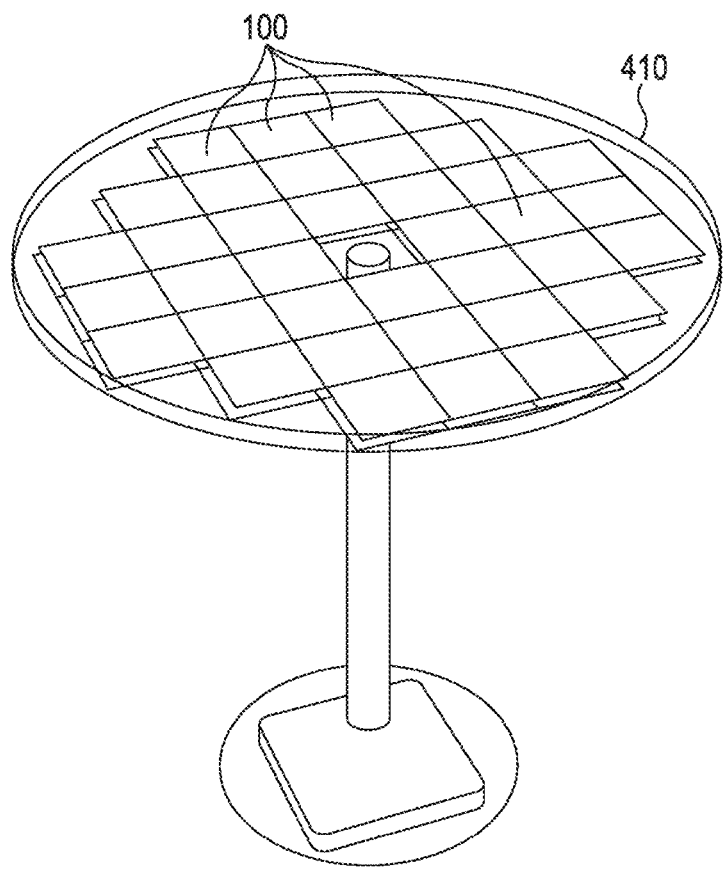
FIG. 3 is a a system for wireless power transfer, applied to a coffee table.

FIG. 3 more clearly illustrates the concept of a table 410 (e.g. coffee table) that is configured as a large area wireless power providing surface using an array of tiled elements. At least some of the tiles in the array would be input elements, for example at the edge of the table 410, by which the remaining power transfer elements/tiles in the array are energised, such that devices placed on the table surface receive power wirelessly by propagation of magnetoinductive waves through the array of resonators.

Although an example has been described in which each tile comprises a single element, this is not essential, and double element tiles/tiles (comprising two elements of any kind) and tiles with more than two elements are also envisaged.

Figure 4:
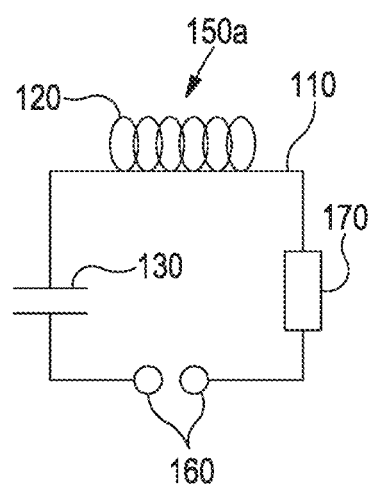
FIG. 4 is an equivalent circuit for an input element at which current is directly injected.

FIG. 4 illustrates an example circuit diagram 150a for an input element 150 in which current is directly injected onto the resonator 110. The resonator 110 comprises an inductor 120, capacitor 130, resistance 170 and current injection nodes 160, all connected in series.

For the sake of simplicity in this disclosure, capacitance, resistance and inductance are often depicted as lumped elements, but it will be appreciated that in a real system at least some of these may be distributed (at least to some extent). For instance, a conductor loop may have distributed self-inductance and resistance, and some distributed capacitance with any adjacent conductors (or ground plane).

An input element 150 configured for directly injecting current to the resonator 110 may further comprise drive electronics (not shown), which may include an impedance matching network between an AC supply (voltage or current) and the resonator 110.

The input element may further comprise a controller (e.g. processor or microcontroller), and may include control functionality (e.g. software/firmware) for configuring and optimally driving the array of elements coupled (magnetoinductively) thereto. More than one input element may be provided to feed a medium with magnetoinductive power. This may be appropriate for relatively large arrays (e.g. comprising more than 4, 5, 6, or 10 elements in extent).

Figure 5:
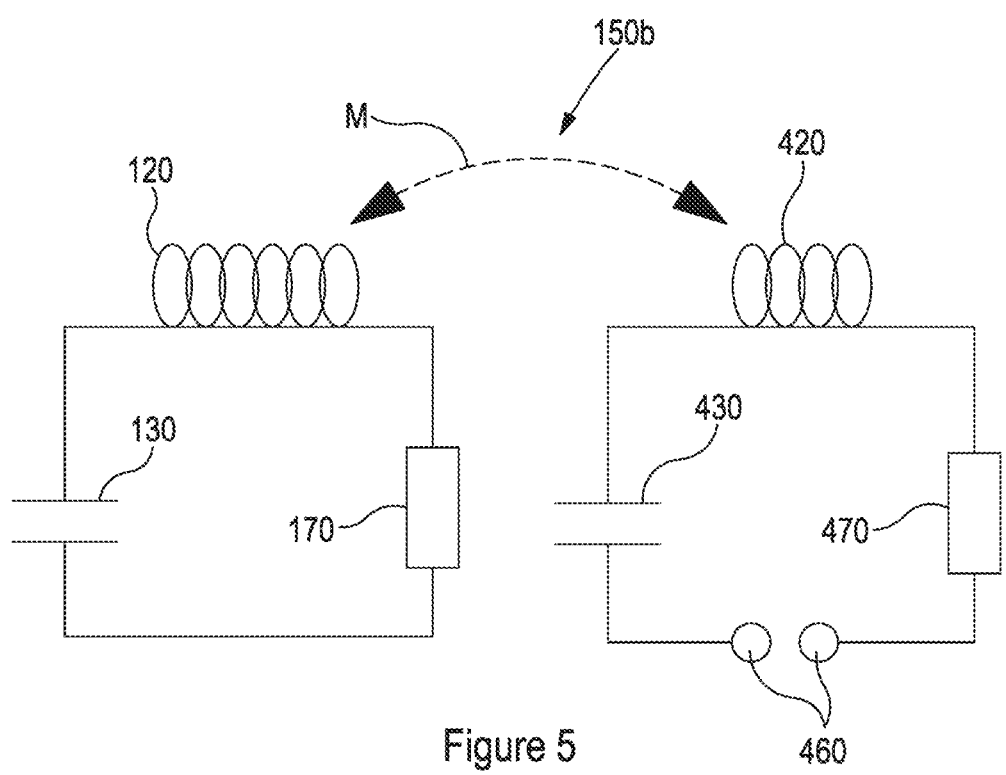
FIG. 5 is an equivalent circuit for an input element at which current is excited by inductive coupling with a further resonator.

FIG. 5 illustrates an alternative circuit diagram 150b for an input element, in which power is provided to the resonator by inductive coupling M with a further resonator (which may be patterned on the tile within the resonator, or on the opposite side of the tile to the resonator). The further resonator comprises an inductor 420, capacitor 430, resistance 470 and current injection nodes 460 for injecting current from drive electronics (which may also be provided on the input element 150). An advantage of this indirect drive is that the further resonator may be less constrained in design than the resonator (which should have high Q for efficient power transfer), and the further resonator may be more straightforwardly matched to a drive circuit.

The input element 150 may be powered by electromagnetic induction from a power supply 350 (as shown in FIG. 2). The adjacent elements may be operable to communicate electrical power from a power supply 350 comprising a Rezence compliant charging pad to a Rezence compliant receiver (at the target device 300). This is merely an illustrative example, and the invention does not rely on compliance with a particular standard.

Figure 6:
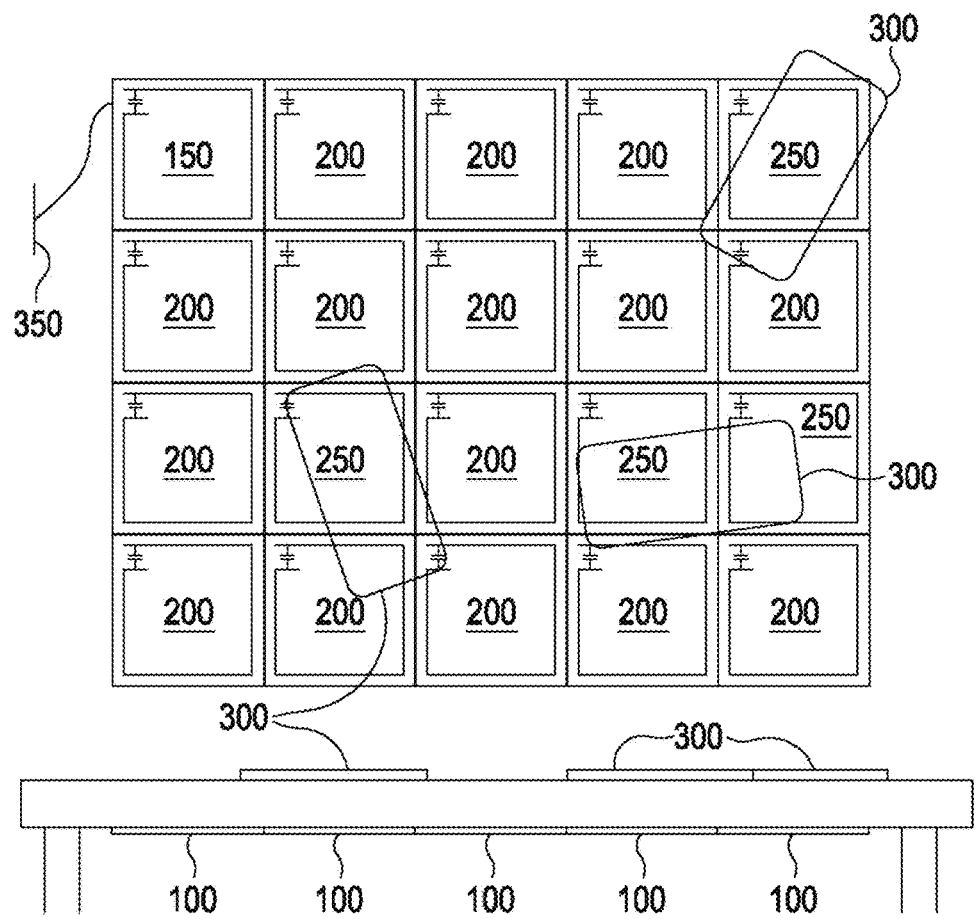
FIG. 6 is a system for wireless power transfer, applied to the underside of a table, for providing power to target device on top of the table.

Referring to FIG. 6, an example is shown comprising a two dimensional array of elements 100, each element 100 provided on a separate tile. The tiles are placed on the underside of a table. The element in the top left of the array is an input tile 150, which receives power from an external power supply 350, and which feeds the array with a magnetoinductive wave, which propagates through the remaining tiles 200, 250 which are each power transfer tiles. The power transfer tiles are respectively operating as intermediate elements 200 and output elements 250. The output elements 250 are the elements that have relatively high inductive coupling with the target devices 300 placed on the table top surface. Each of the output elements 250 provides electrical power to a respective target device 300 on top of the table. In this example, there are three target devices 300.

Some systems include elements (e.g. power transfer elements) that are controllable. A controllable element comprises means for changing the electrical properties of the resonator thereof, so as to change the degree to which the controllable resonator participates as an element of the magnetoinductive medium. Under some circumstances, more optimal distribution of power through the array may be achieved by effectively disabling some elements of the array (e.g. by giving that element a high impedance or low Q at the resonant frequency).

Figure 7:
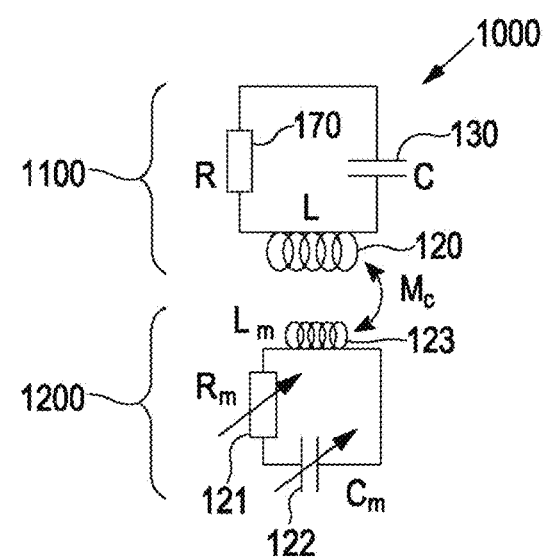
FIG. 7 is a generalised equivalent circuit for a controllable element, comprising a primary resonator and a secondary resonator.

An example of a controllable element 1000 is illustrated in FIG. 7. The controllable cell 1000 comprises a primary resonator 1100 and a control device 1200. The primary resonator 1100 comprises a capacitor 112, inductor 113 and a resistor 111. The control device 1200 comprises a secondary resonator that includes a capacitor 122, resistor 121 and inductor 123. The secondary resonator is inductively coupled to the primary resonator 1100 by the mutual inductance $M_c$ between the inductors 113, 123. The resistor 121 of the secondary resonator is a variable resistor, and the capacitor 122 is a variable capacitor (both responsive to control signals, that are not shown).

Using an inductively coupled control device 1200 avoids the need to interfere with the design of the primary resonator 1100. Adding tuning elements into the primary resonator 1100 may degrade the Q factor thereof, or reduce the mutual coupling between adjacent primary resonators of the waveguide.

Since the secondary resonator 1200 is inductively coupled to the primary resonator 1100, it contributes to the impedance thereof. Varying the resistance and capacitance of the control device 1200 therefore affects the impedance of the primary resonator 1100.

The impedance contribution $Z_e$ from the secondary resonator 1200 is given by:

$$Z_e = \frac{\omega^2 M_c^2}{Z_m} \quad (1)$$

Where $Z_m = R_m + j(\omega L_m - 1/\omega C_m)$, and the impedance of the primary resonator $Z_p$ is given by:

$$Z_p = R + j(\omega L - 1/\omega C) + Z_e \quad (2)$$

Several possibilities for the control device 1200 can be considered. Where $R_m$ is very large, the contribution $Z_e$ of the secondary resonator 1200 to the impedance $Z_p$ of the primary resonator 1100 will be very small. Where $R_m$ is small, and $L_m C_m = LC$ (i.e. the resonant frequencies of the primary and secondary resonators 1100, 1200 are matched), the effect of the secondary resonator will be to cause an anti-resonance (high impedance) in the impedance of the primary resonator 1100 at the resonant frequency $\omega_c$ of the un-coupled primary resonator 1100 ($\omega_c = 1/\sqrt{LC}$). The coupled system of the primary and secondary resonator 1100, 1200 will have two resonant modes: a first mode in which the currents in the inductors 113, 123 of the primary and secondary resonator are in-phase, and a second in which these currents are out-of-phase. Tuning $R_m$ allows the effect of the secondary resonator to be changed. For instance, the effect of a secondary resonator 1200 with matched frequency and a larger $R_m$ would be to reduce the Q factor of the resonance of the primary resonator 1100.

Where $R_m$ is small, and $L_m C_m \neq LC$ (i.e. the resonant frequencies of the primary and secondary resonators 1100, 1200 are not matched), the effect of the secondary resonator 1200 will be to cause two coupled modes of current oscillation with different frequencies.

Figure 8:
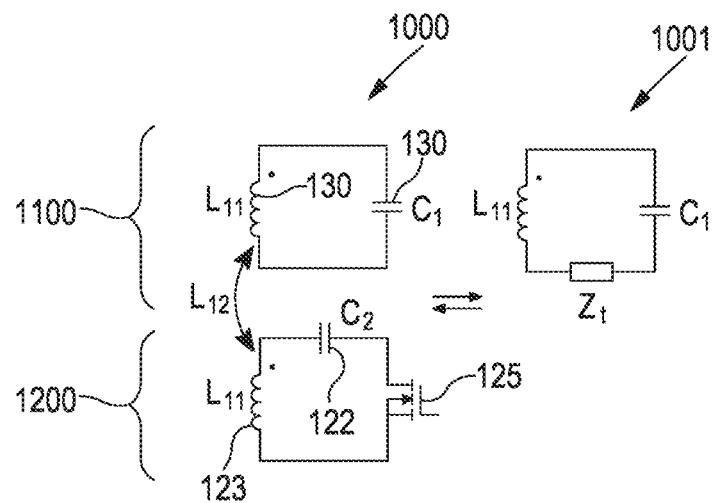
FIG. 8 is an equivalent circuit for a specific controllable element, in which a secondary resonator comprises an active element in the form of a transistor.

FIG. 8 shows an example of a controllable cell 1000, similar to that of FIG. 7, in which the control device 1200 includes a secondary resonator. The secondary resonator comprises an active control component 125 for varying the effective resistance thereof. The active control component 125 may comprise a transistor, photodiode or any component that can change resistance in response to a control signal. In FIG. 8 a MOSFET transistor is used at the active control component 125, and the control signal is a voltage applied to the gate of the transistor. When the transistor is in a saturation state, it presents a low resistance, and when in a subthreshold state, a high resistance. The control device 1200 will affect the impedance of the primary resonator 1100 much more when the transistor is in a saturation state that when in subthreshold state. The control signal to the transistor can be thought of as a digital on-off, turning on and off the effect of the control device 1200. Alternatively, the active control component 125 may be operated with a greater resolution, to modulate the effect of the control device 1200 (e.g. by operating the transistor in a saturation mode).

Each controllable cell 1000 may comprise a primary resonator 1200, arranged concentrically with a secondary resonator of a control device 1200. The inductance and resistance of the primary resonator may be provided by a primary loop 114 which is a split-ring resonator. The split is bridged by a capacitance 112. More than one discrete capacitor may be used, which improves matching by averaging any capacitor variation. The secondary resonator may be within the primary resonator 1100, and comprises a similar split ring resonator arrangement with at least one discrete capacitor 122 bridging the split. Each secondary resonator further comprises an active control component 125, in the form a MOSFET transistor. There may be more than one such MOSFET transistor in parallel (which reduces resistance in the saturation state).

Placing the secondary resonator within the primary resonator 1100 has a number of advantages. This arrangement means that the secondary resonator does not affect the spacing or coupling between the primary resonators, while at the same time achieving good inductive coupling between the primary and secondary resonators. Furthermore, any coupling between different secondary resonators will be minimised.

Figure 9:
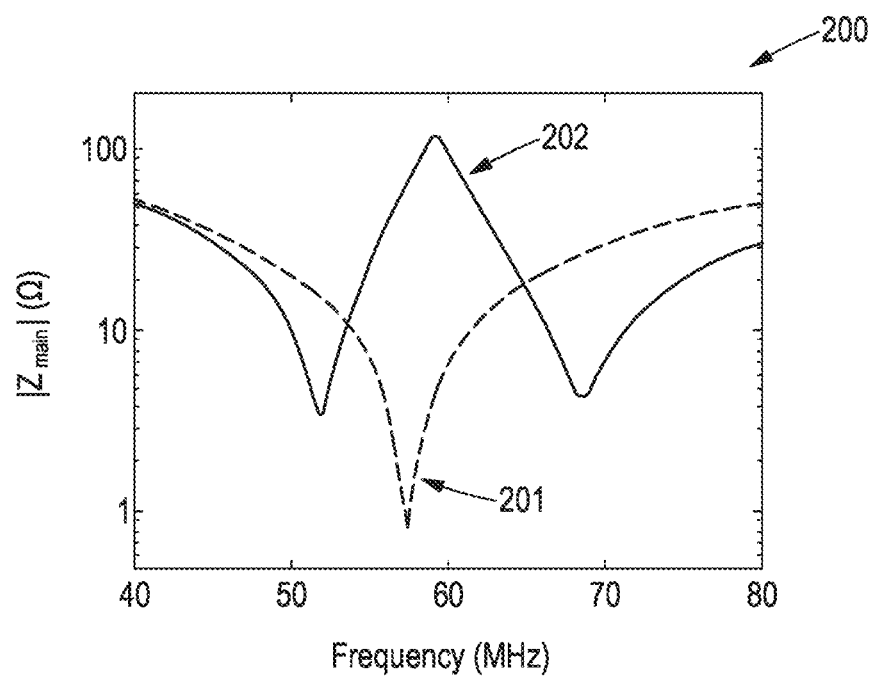
FIG. 9 is a plot of impedance of the primary resonator of a controllable element in an active state (low impedance) and inactive state (high impedance)

FIG. 9 shows the impedance of a single controllable cell 1000, as shown in FIGS. 7 and 8, in a first state 201 in which the active control component 125 has a high resistance (i.e. the transistors are sub-threshold), and in a second state 202 in which the active control component 125 has a low resistance (i.e. the transistors are saturated). In the first state 201, the primary resonator 1100 has a low impedance of 0.8 ohms at the design frequency $2\pi\omega_c$, which in this case is 57.2 MHz. In the second state 202, the primary resonator 1100 has a high impedance of 66 ohms at the design frequency. The Q factor in the first state is 80. The change in impedance at the design frequency may be at least a factor of 10 (in this case, a factor on the order of 100 is achieved).

The primary and secondary resonator may be nested square printed copper coils with surface mount capacitors and transistors. The secondary resonator may be provided on a separate tile that is overlaid on top of the tile that carries the primary resonator. This approach has the advantage of being able to convert a non-controllable element into a controllable element by simply stacking tiles together.

Some or all of the elements in a system may be controllable elements. A system in which each tile is controllable provides a maximum degree of flexibility in configuring the array, a sufficient degree of control over the propagation of magnetoinductive waves through the system may be achieved when only a subset of the elements are controllable.

Figure 10:
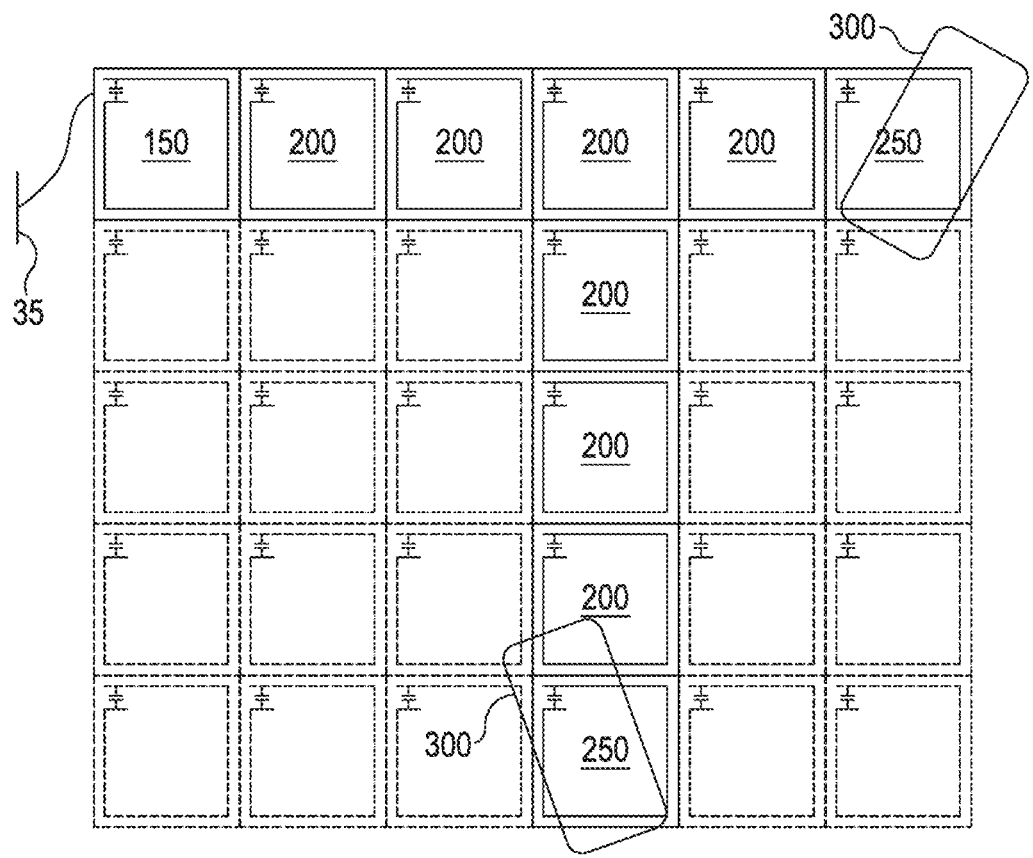
FIG. 10 is a system for wireless power transfer comprising a 2D array of elements, in which controllable elements are used to direct magnetoinductive waves to specific locations corresponding with target devices.

FIG. 10 illustrates an example similar to that of FIG. 6, in which each of the power transfer elements are controllable. A target device 300 is placed at the top right of the array, and a further target device 300 is placed at the bottom edge of the array, four elements across (and five elements down) from the input element 15. In order to more efficiently transfer power to the target devices 300, only some elements 200 of the array (shown in solid lines) may be placed in a high Q state, with low impedance at the system frequency (i.e. the frequency at which the input element injects magnetoinductive waves into the medium formed by the elements). The remaining power transfer elements (shown in broken lines) may be placed into a high impedance state at the system frequency, so that they do not form part of the medium.

At least some elements may comprise a transmitter and/or receiver. For example, a controllable element may comprise a receiver for receiving control instructions, instructing the controllable element to vary the impedance of the resonator 11 (e.g. so as to switch the element into and out of coupling with the medium). Any existing wireless technology may be used to provide wireless communication between tiles, for example ZigBee, Wifi, or Bluetooth.

Figure 11:
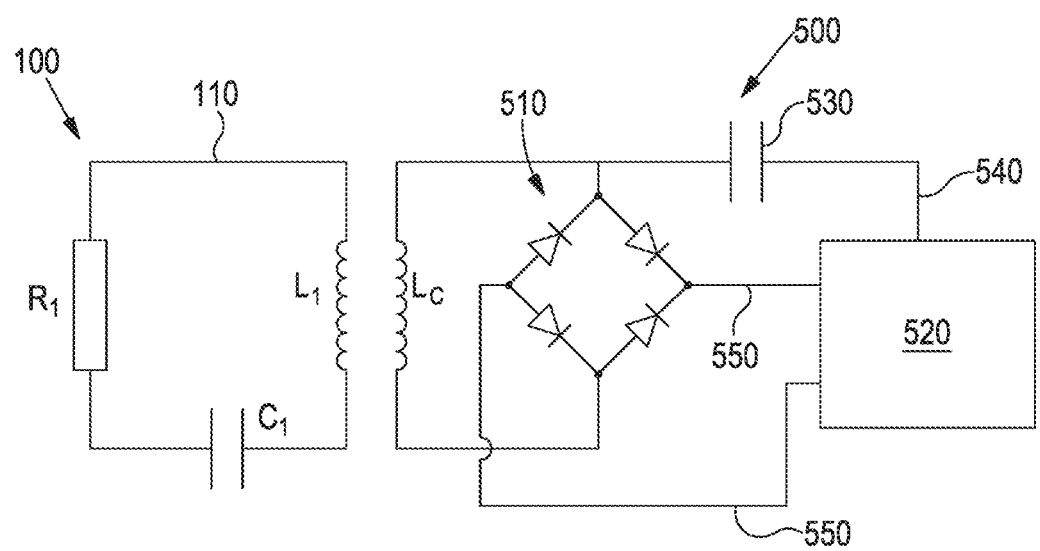
FIG. 11 is a circuit diagram of an element comprising a power converter and active electronics powered by the resonator of the element.

In order to power active devices comprised within an element, the element may comprise a power converter, operable to derive power from the resonator of the element to power active devices of the element. A circuit diagram is shown in FIG. 11, in which a further inductor $L_c$ is inductively coupled to the inductance $L_1$ of the resonator 110, to induce an alternating current in the further inductor. The alternating current in the further inductor may be rectified, for example using a diode bridge, to provide DC power to active electronics 520 within the element 100, which may comprise a controller (e.g. microcontroller or processor). The active electronics 520 may comprise a modem, and a capacitor 530 may be used to pass AC signals from the further inductor to the modem, for example to communicate data that is carried by modulation of the current in the resonator. Such modulation can be transmitted by the magnetoinductive waves propagating through the medium of the elements. The modem may be configured to modulate the current in the resonator using a control device in a controllable element (for instance, as described above). The modem may be capable of both receiving and transmitting data via magnetoinductive waves carried by the primary resonator. The modem may be further configured to transmit and receive digital signals, for example to control devices integrated with the element, or to receive data from devices integrated with the element.

Each controller in a system of elements may be configured with a unique identification code, so that communication intended for, or coming from, that controller may be conveniently identified by use of this identification code.

Although a diode rectifier is depicted in FIG. 11, any suitable method may be used to convert power in the further inductor $L_c$ to a useable form. For example, a switched mode power converter may be used, or any other appropriate conversion method.

Figure 12:
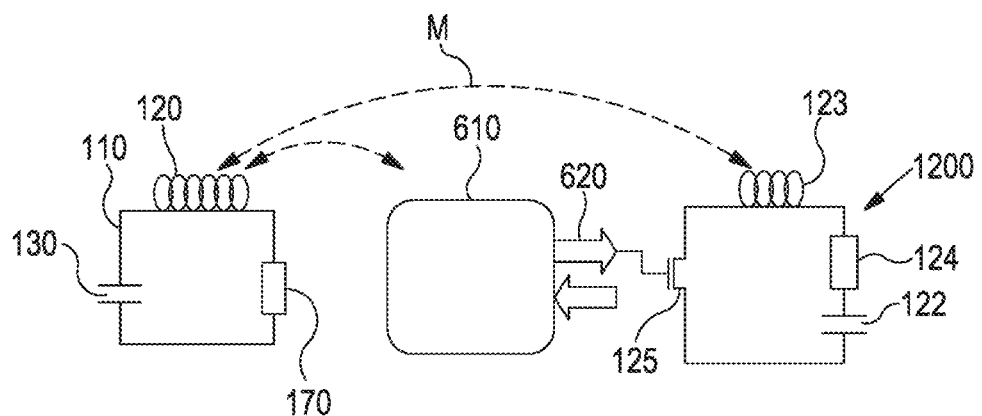
FIG. 12 is a circuit diagram of a controllable element, illustrating how a controller may derive power from the resonator and control the control device of the controllable element.

Referring to FIG. 12, a circuit diagram of a controllable element including a controller 610 is shown. The controller 610 comprises a modem, and receives data and is powered by inductive coupling with the primary resonator 110 (as indicated by the dashed arrow from the primary resonator 110). The controller 610 is configured to provide a control signal 620 to the active control component 125. The controller 610 can therefore effectively prevent the element from forming part of the medium for propagating magnetoinductive waves in response to a signal. In this example the control device is a secondary resonator comprising a transistor 125 as the active control component, but other control arrangements may also be used.

Figure 13:
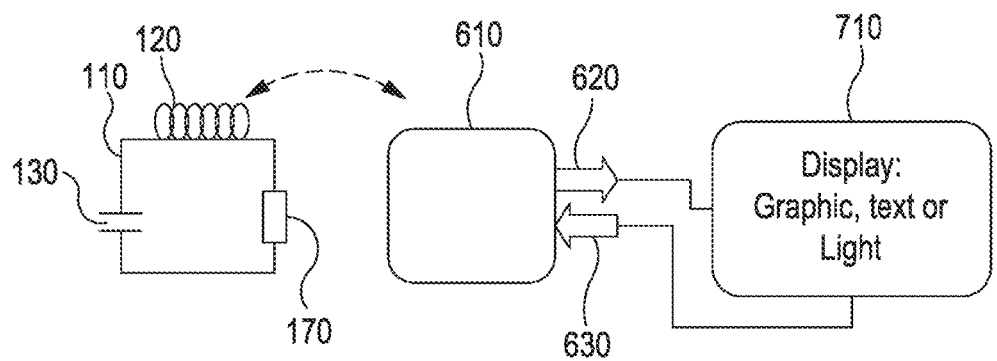
FIG. 13 is a circuit diagram of an element comprising a display device, which is powered by the resonator of the element, and which may also receive data via modulated magnetoinductive waves received by the element.

An element may comprise a display device 710 controlled by the controller 610, as shown in FIG. 13. The controller 610 may be powered and receive data via magnetoinductive waves from the primary resonator 110, and in response to instructions in the data, provides digital control signals 610 to the display device 710. The display device 710 may further communicate digital signals 630 to the controller, which may pass data representing the status of the display device 710 to other elements in the array (via magnetoinductive signals). Elements of the array may be configured to form a composite display, with an element configured as a control element (e.g. an input element) instructing each adjacent tile to display part of a picture or video, so that the whole array works together to provide a display device. Such an array may be relatively easy to assemble and electrically connect, since no wired connections are required between each element of the array. Such a display can be made very rugged, and is inherently straightforward to make waterproof—connectors are notorious points of failure (e.g. for water ingress) in any electronic system.

Display elements may be the target devices. A power and data backplane comprising an array of power (and data) transfer elements may be provided, and a display layer comprising display elements provided, stacked on the power and data backplane. Each display element may be configured to receive power and data from the underlying power transfer element (or input element).

Figure 14:
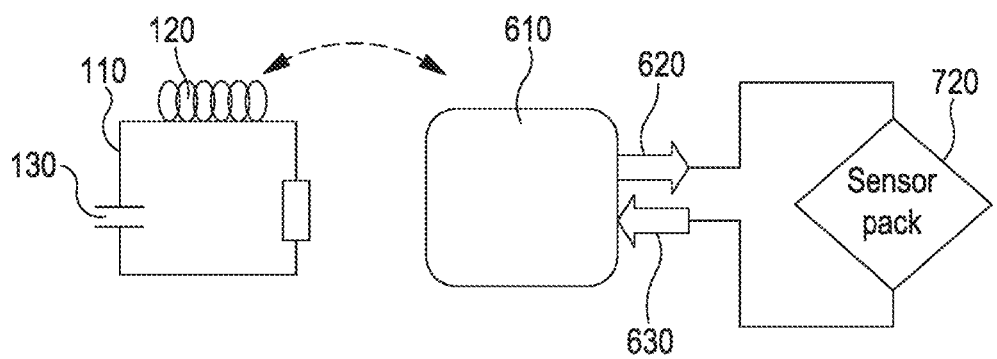
FIG. 14 is a circuit diagram of an element comprising a sensor.

An element may comprise at least one sensor, as shown in FIG. 14. This example again includes a controller 610 powered from and receiving signals via the primary resonator 110, At least one sensor 720 is in communication (e.g. digital communication) with the controller 610. The at least one sensor 720 may be able to receive signals 620 from the controller 610, and the controller 610 may be able to receive signals from the sensor 720. Example sensor modalities include image sensors, vibration, light, temperature and current/voltage sensing etc.

At least one element may be provided with power transfer monitoring sensors to detect and communicate when an element is loaded by a target device receiving power, so that the array can be reconfigured to provide optimal power transfer to the target devices (e.g. at maximal efficiency, or at maximum power transfer rate).

The system may further comprise a locator wand for setting up the system, allowing the locations of each tile to be identified during installation, using the wand. The wand may communicate with a system controller (which may be incorporated in an input tile) to identify the location of each element in an array of elements. The wand may, for example, allow the user to read the unique identification code of each element, so that the position of each tile can be recognised within an array by the system controller.

The system controller may comprise a model of magnetoinductive wave propagation through the medium, and the system controller may be configured to use this model to determine which tiles should be switched off (i.e. placed in a high impedance state so as not to participate in the medium) for optimal power transmission to the target device(s).

In order to illustrate ways in which the system controller could reconfigure a medium according to the invention to optimise power transfer, some discussion of power transfer within a medium in accordance with an embodiment will be described, with reference to FIGS. 17 to 21.

Figure 16:
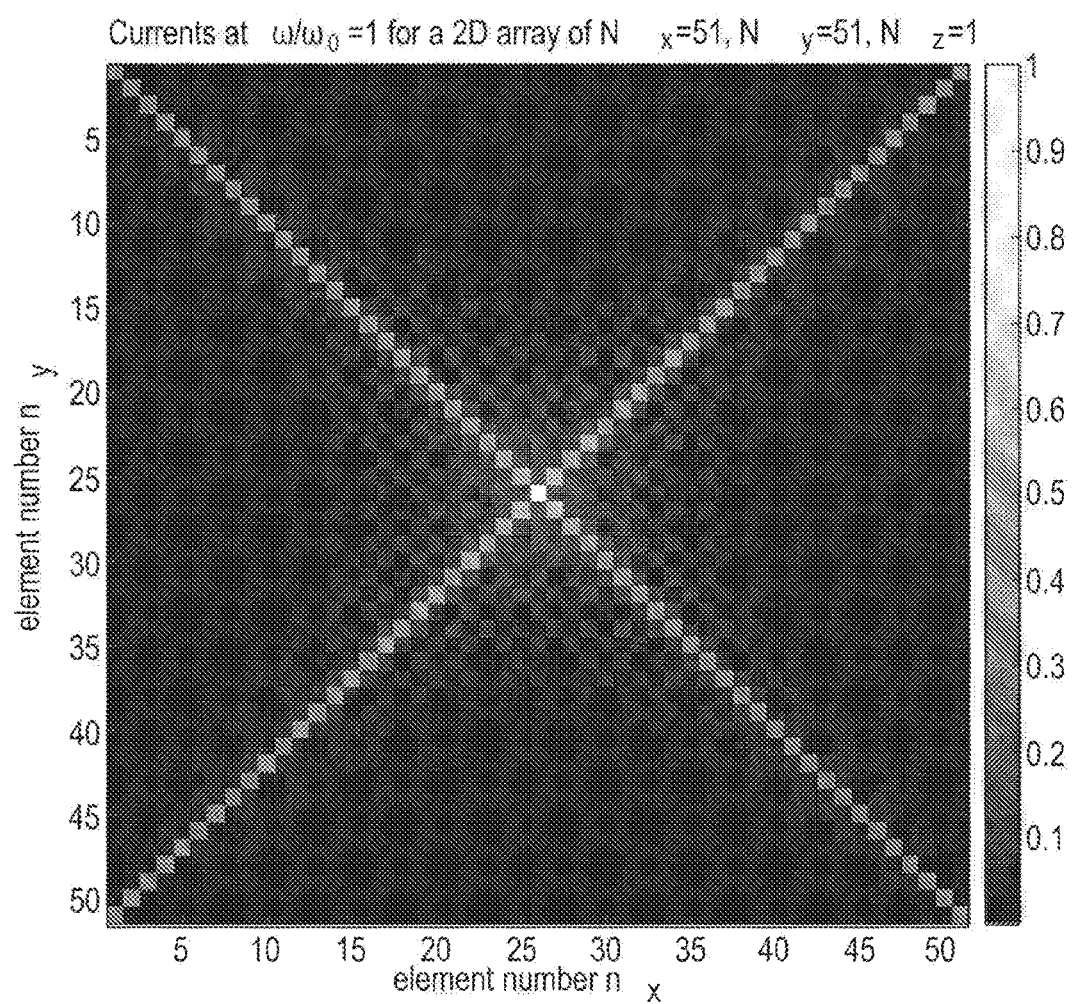
FIG. 16 is a simulation of beam formation in a 51×51 array of electrical resonators.

FIG. 16 is a simulation of a square lattice array of 51×51 elements. Each element in the simulated array comprises a resonator which is inductively coupled to its neighbours, and which has the same resonant frequency. The central element in the array is an input element, at which current is injected. The plot shows a normalised current in each of the resonators as a colour map. In the model, only coupling between nearest neighbour elements was included.

Figure 17:
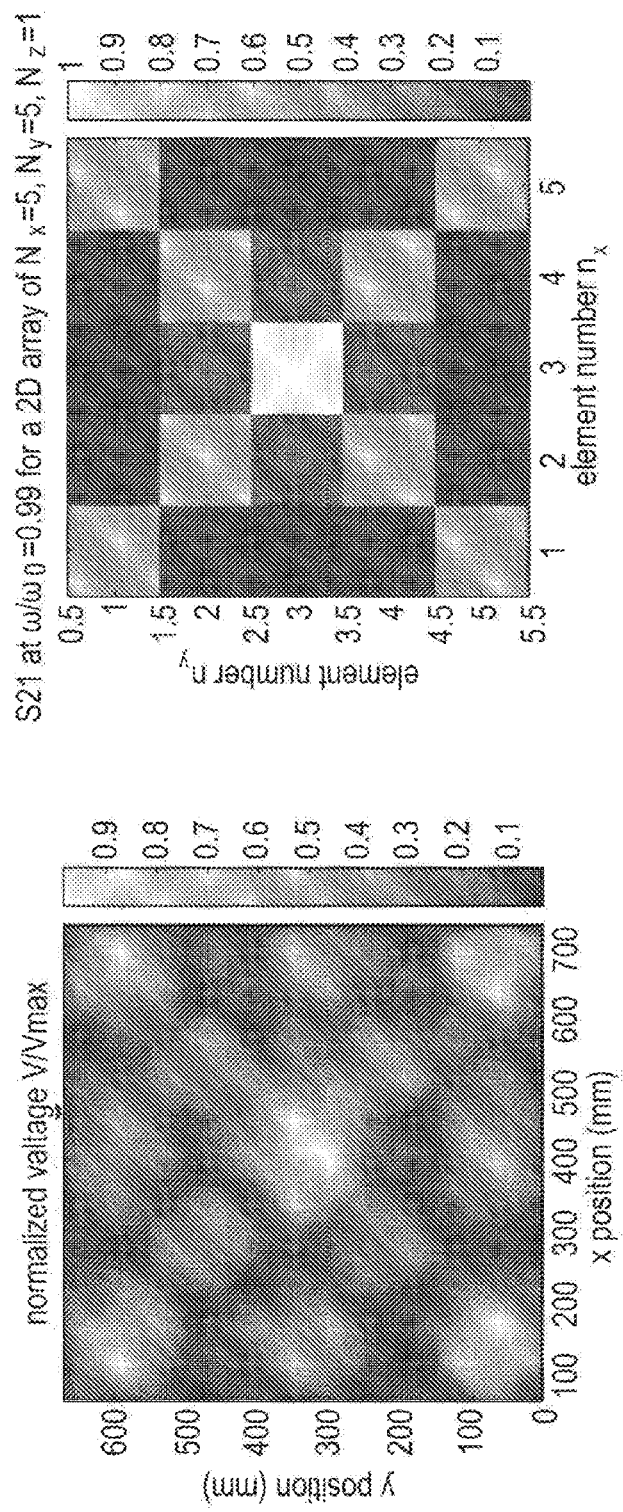
FIGS. 17 to 20 show experimental results (left) and simulations (right) of magnetoinductive wave propagation through a 5×5 array of electrical resonators, illustrating the effects of disabling/removing electrical resonators of the array.

An electric current in one of the elements of the two-dimensional lattice will therefore excite currents in the neighbouring coils via magnetic/transformative coupling. This excitation will propagate in the lattice in a form of a magneto-inductive wave (MIW). These waves obey the dispersion law in relation to energy/frequency and direction of propagation, which strongly depends on the lattice geometry. When excited at or in the vicinity of the resonant frequency of the identical individual elements, $f_r$, the MIW is forced to propagate in a very specific range of directions— symmetry axes of the Brillouin zone. In square lattices, MIW excited at frequencies close to $f_r$, travel along $k_x=k_y$ (as shown in FIG. 17), where $k_i$ are the components of the MIW wave-vector. In physical space, this corresponds to the diagonal propagation of MIW in an array of resonant elements, which is what is shown in FIG. 17. In a real system the MIW will spread across several elements as a result of coupling with non-nearest neighbours—the example model in FIG. 17 is simply used to clearly illustrate directional propagation through a medium in accordance with an embodiment.

The ability of a metamaterial medium comprising a plurality of electrical resonators to collimate MIWs and convert them into narrow directive magneto-inductive beams (MIBs) can be used to help optimise power transfer in the context of an array of power transfer elements.

In order to illustrate this, FIGS. 18 to 21 show experimental results (left) and simulations (right) of MIW propagation through a 5×5 array of elements (each disposed on a separate tile/PCB). The experimental data was obtained by near field scanning of the array. The theoretical model is again based on coupling only between nearest neighbour elements. Discrepancies between theory and experiment can be attributed partly to this approximation, and partly due to the limited resolution of the experimental scans.

Figure 18:
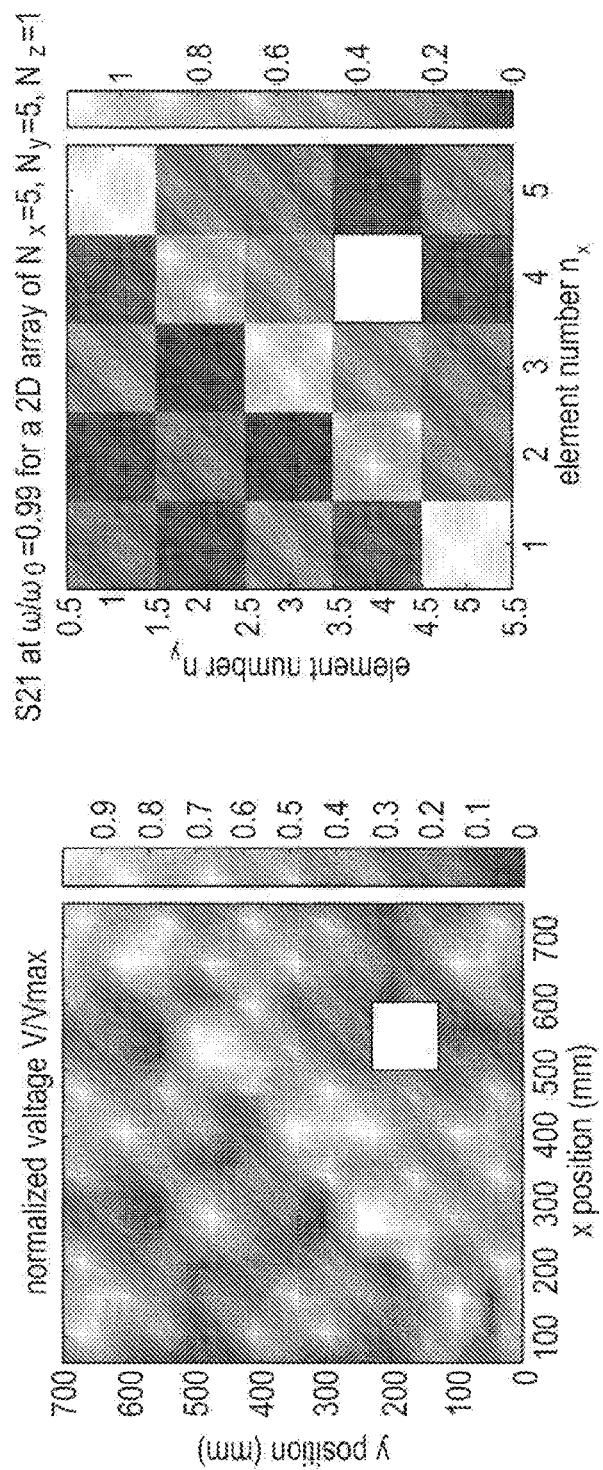
Figure 19:
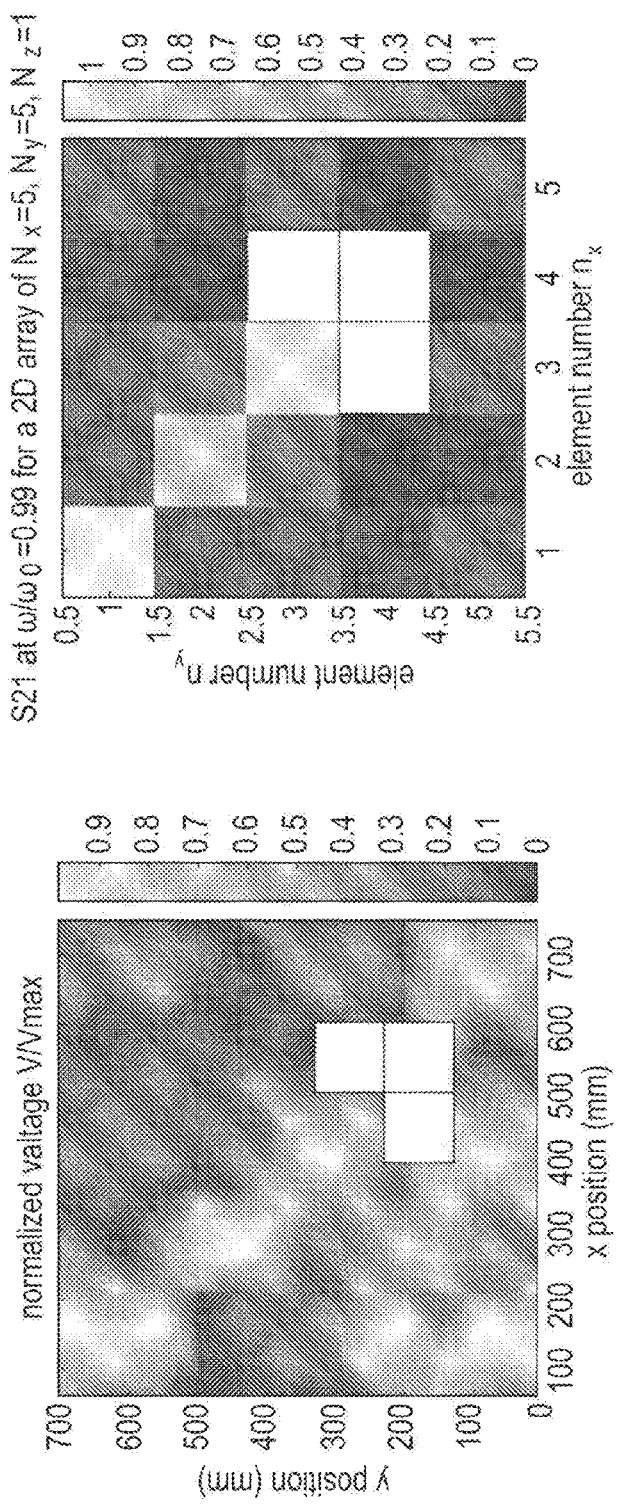
Figure 20:
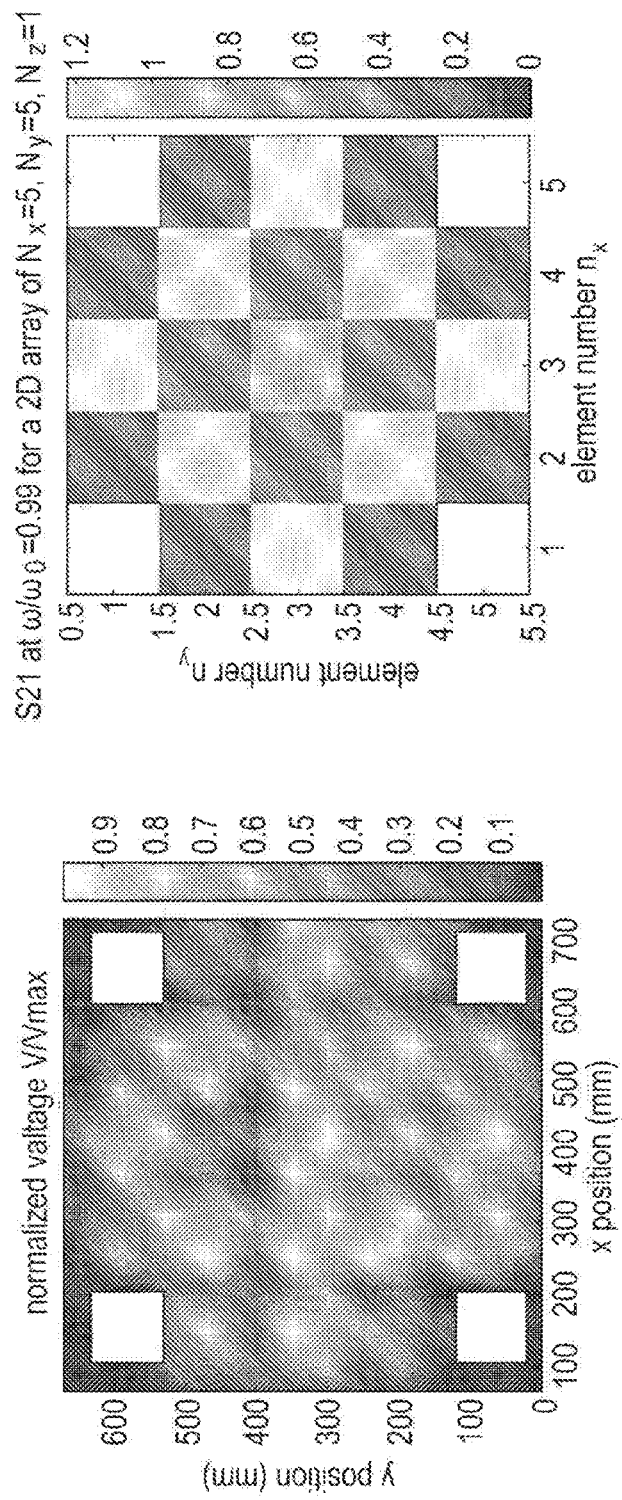

In the examples of FIGS. 18, 19 and 20, constructive interference of dispersive MIWs is used to increase current flow in specific (target) resonators.

The linear dimensions of each tile was 10 cm; average resonance frequency 6.73±0:3% MHz; quality factor 232±1: 7%; coupling coefficient of aligned, adjacent tiles ≈−0.07 (de ned as the ratio of mutual inductance to the self-inductance of the tiles).

In FIG. 17, the central element (at $n_x=3$, $n_y=3$) is excited, and each of the other elements in the array is allowed to operate as a matched resonator in the array. The result is that a diagonal MIW with $k_x=k_y$ propagates in the 5×5 array, as shown in both experimental and simulated results.

FIG. 18 illustrates how a controllable element can be used to alter the pattern of MIW propagation through the array (thereby changing the distribution of current amplitude in the various elements). In FIG. 19 the element at $n_x=4$, $n_y=4$ has been removed (simulating a controllable element in a high impedance state), while the central element is again excited. The result of this is that the MIW is reflected along diagonals centred at the point of reflection, thereby strengthening the current in elements $n_x=1$, $n_y=5$; $n_x=2$, $n_y=4$; $n_x=4$, $n_y=2$ and $n_x=5$, $n_y=1$.

In FIG. 19, three elements are removed (at $n_x=3$, $n_y=4$; $n_x=4$, $n_y=4$ and $n_x=4$, $n_y=3$) to re-direct the diagonal MIB heading towards $n_x=5$, $n_y=5$. In the simulation this results in a strong reflection and enhanced power delivery to $n_x=1$, $n_y=1$. In the experiment, there is some leakage over the gap, illustrating that the coupling in practice is more complex than nearest-neighbour.

FIG. 20 illustrates that the power distribution in s square array of elements can be made more uniform by disabling or removing corner elements of the array. In this set of results the elements at $n_x=1$, $n_y=1$; $n_x=1$, $n_y=5$; $n_x=5$, $n_y=1$; and $n_x=5$, $n_y=5$ were removed. The result is the that diagonal MIBs are reflected from the corners to provide a more even distribution of current through each resonator of the medium.

A system comprising current sensors and controllable elements may optimise power distribution through an array by operating in an initialisation phase to determine the relationship between current distribution in the array and the state of controllable elements. A model of the relationship may be based on a simplified physical representation of the coupling between neighbouring resonators (e.g. nearest neighbour approximation). Alternatively, the model may comprise a neural network that has been trained during an initialisation phase to model the relationship. The model may comprise the locations of the elements, which may be provided to a system controller by a user (e.g. via a GUI, or using a locator wand).

In these examples defects in the array of resonators was created by removing a tile comprising a resonator, but equivalent results can be achieved by switching a resonator of a controllable element 'off', for example by using a secondary resonator (e.g. as discussed above).

The term metasurface may be used herein to mean a 2D MIW supporting medium. In the examples disclosed herein, an array of electrical resonators, each disposed on a tile, is used. Similar methods can also be used in 3D matamaterials, supporting 3D MIWs.

MIWs propagating along finite metasurfaces will form standing wave patterns. These patterns can be experimentally identified by scanning a near field probe across the metasurface to measure the induced magnetic field amplitude. Maxima of magnetic field amplitude, or "hot spots" (if strongly localised) correspond to locations of most efficient power transfer available on the metasurface. These are the locations where a wirelessly charging device would charge best. Field patterns will change if the frequency of excitation of the MIW changes—this can be especially pronounced near the resonant frequency of the resonators that form the matematerial. At a specific frequency (or range of frequencies), field patterns defining the location of magnetic field maxima depend on the geometry of the metasurface—its boundaries, degree of anisotropy, and degree of uniformity. These aspects of a metasurface can be tailored to control propagation of MIWs in the metamaterial to produce constructive interference at target locations.

The metamaterial may comprise different elements for controlling MIW propagation, including,
  switchable/tuneable tiles or elements, such as those described above;
  source elements (powered resonators) and their combinations.
Any of the elements can be:
  passive, fixed in the system;
  active—switchable or tuneable (e.g. switchable lattice defects, switchable array borders, switchable array borders; phase changing excitation sources etc. The control over switchable/tuneable active tiles can be accomplished using FETs, photo-conductive relays, MEMS etc. In sources, this can be achieved by an additional controller that monitors the excitation signal and amplitude at the powered resonator.
In general, mechanisms for MIW control can be considered to fall into the following categories:
  Engineering specific distributed field patterns (e.g. uniform, checkboard) for a specific power-transfer area coverage. This may be especially useful for "low power" regimes, including data transfer architectures;
  Engineering standing wave patterns to localise power delivery to a certain area or areas on the metasurface; e.g. creating magnetic hot spots at specific locations;
  Creating quasi-1D channels in metasurfaces for direct source-to-device power delivery.
Any of the effects described herein can be:
Static—fixed in time;
Dynamic—changing in time, e.g. periodically
The methods described herein are applicable to MIWs propagating in metamaterials (such as metasurfaces) at frequencies close to the resonant frequency $f_r$ of each resonator, which will have strong spatial dispersion, and also to MIWs propagating at frequencies significantly different from $f_r$, which will have weak spatial dispersion, with propagation similar to cylindrical waves). The principles disclosed herein can be applied to control MIWs that carry power and/or data—in either case, the efficiency with which current is coupled through the array is important. Cardinal terms such as N, S, E and W may be used to describe regions of arrays in this disclosure, with N corresponding with an upward direction with reference to the diagram. Such directions are relative, and do not specify a particular direction with respect to an external frame of reference.

In the examples, square lattices of electrical resonators are considered. The control methods described herein are also applicable to triangular and hexagonal arrays. The general approach of controlling constructive interference of MIWs to increase current flow in a target tile is applicable to any set of electrical resonators that support MIWs, including aperiodic or random assemblies of resonators. In the examples described herein, arrays of identical electrical resonators will be considered.

Arrays of $N_x \times N_y$ elements will be considered by way of example, where $N_{x,y}$ are odd numbers and where the source tile is placed in the centre of the array, at element number $(N_x+N_y+1)/2$. The methods disclosed herein will of course work with arrays comprising an even number of elements in x and/or y, and with source resonators that are not located at the centre (e.g. at the edge, or plural source resonators).

Defects in the lattice may be created by electrical resonators that are either absent, switched off or detuned from the nominal design resonant frequency. Methods by which a switchable resonator (or a controllable element) can be implemented have already been discussed above. A switchable resonator may be one that is identical to the other resonators of the array when in an 'ON' state, and significantly different from the other resonators of the array when in an 'OFF' state. An 'OFF' state can be achieved by: physical removal; direct detuning or switching; detuning via a strongly-coupled additional resonator. In terms of circuit design, this switchability can be achieved through the use of FETs, relays, MEMS switches and other components with similar functionality.

In the examples provided, two different coupling regimes are considered: weakly-coupled arrays where only the next-nearest neighbours (adjacent tiles) are coupled; and strongly-coupled arrays where three next-nearest neighbours are coupled (adjacent, corner touching, and adjacent to adjacent).

The example numerical calculations and experimental data were obtained for tiles in which the shape of the electrical resonator's inductor is square (as shown in FIG. 15); and the number of coil turns is four. The array pitch for the example resonator is 103.75 mm and the distance between the centres of the outermost coil tracks of each electrical resonator is 100 mm.

The electrical parameters of the example resonator are: self-capacitance $C_0$=5.43 pF (distributed over the inductor), resonator capacitance (lumped) $C_a$=188 pF, inductance $L_0$=2.89 µH, quality factor Q=232, $f_r$=6.73 MHz.

MIWs launched in 2D arrays of resonators reflect from the array borders, forming standing-wave patterns. These patters define tiles with high and low current intensity and, consequently, the 'hot spots' for efficient power-transfer (e.g. to a receiver is placed over one of the high-current tiles).

Parameters of the system are adjusted in order to tailor the current distribution profile across the tiles.

Engineered Border Profiles

The borders of 2D arrays (or a 3D array) can be engineered by creating a pattern or profile of defects in contact with an edge of the array to create specific standing MIW patterns. The profile of defects at the border can be implemented by either removing a set of resonators, adding a set of resonators or switching a set of resonators on or off (e.g. by detuning from their resonant frequency, or control of a secondary resonator).

This method may be especially important for operating frequencies close to the resonance frequency of individual tiles, because around that frequency, MIWs become strongly dispersive; the direction of their propagation is defined by the metasurface lattice geometry.

Figure 21:
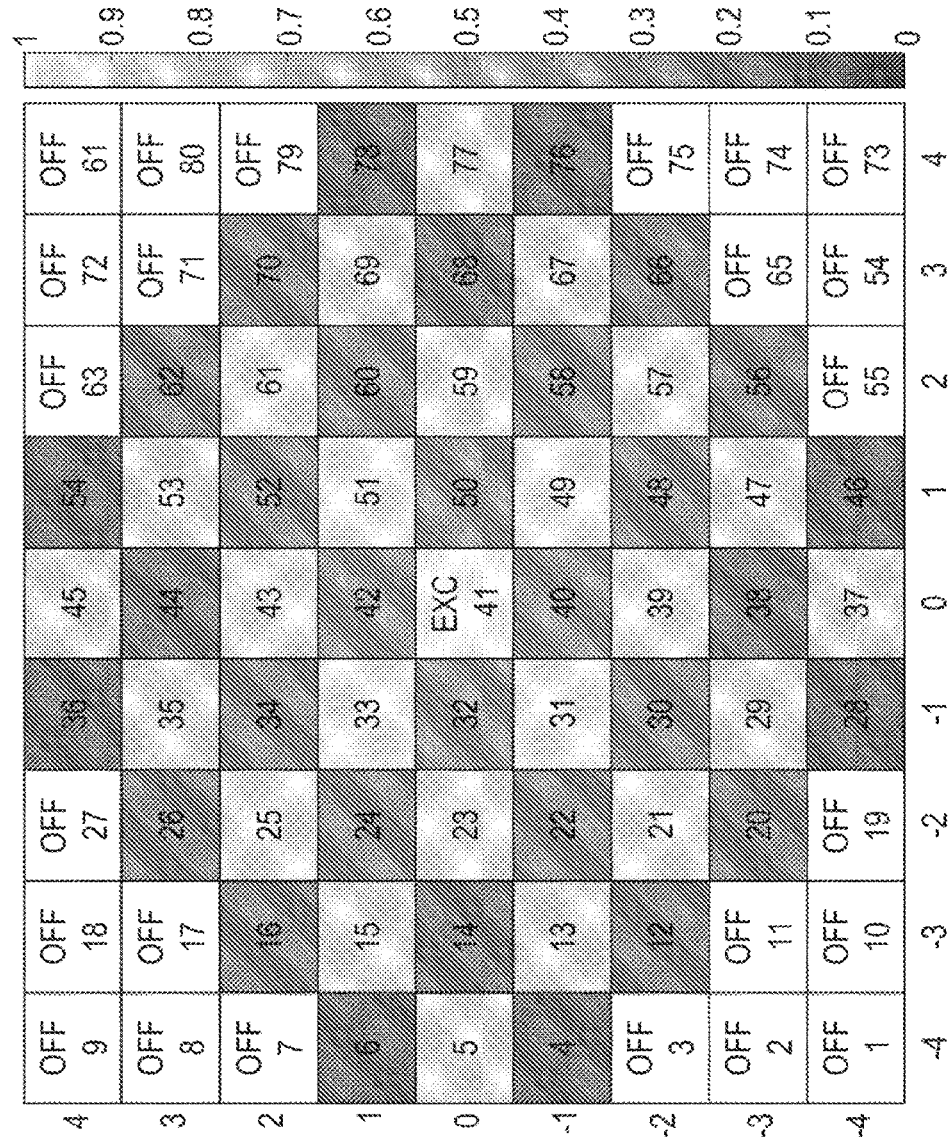
FIG. 21 shows current intensity in a weakly coupled (nearest neighbour only) 9×9 array excited at the resonant frequency in which resonators in corner regions are not present or switched off.
Figure 22:
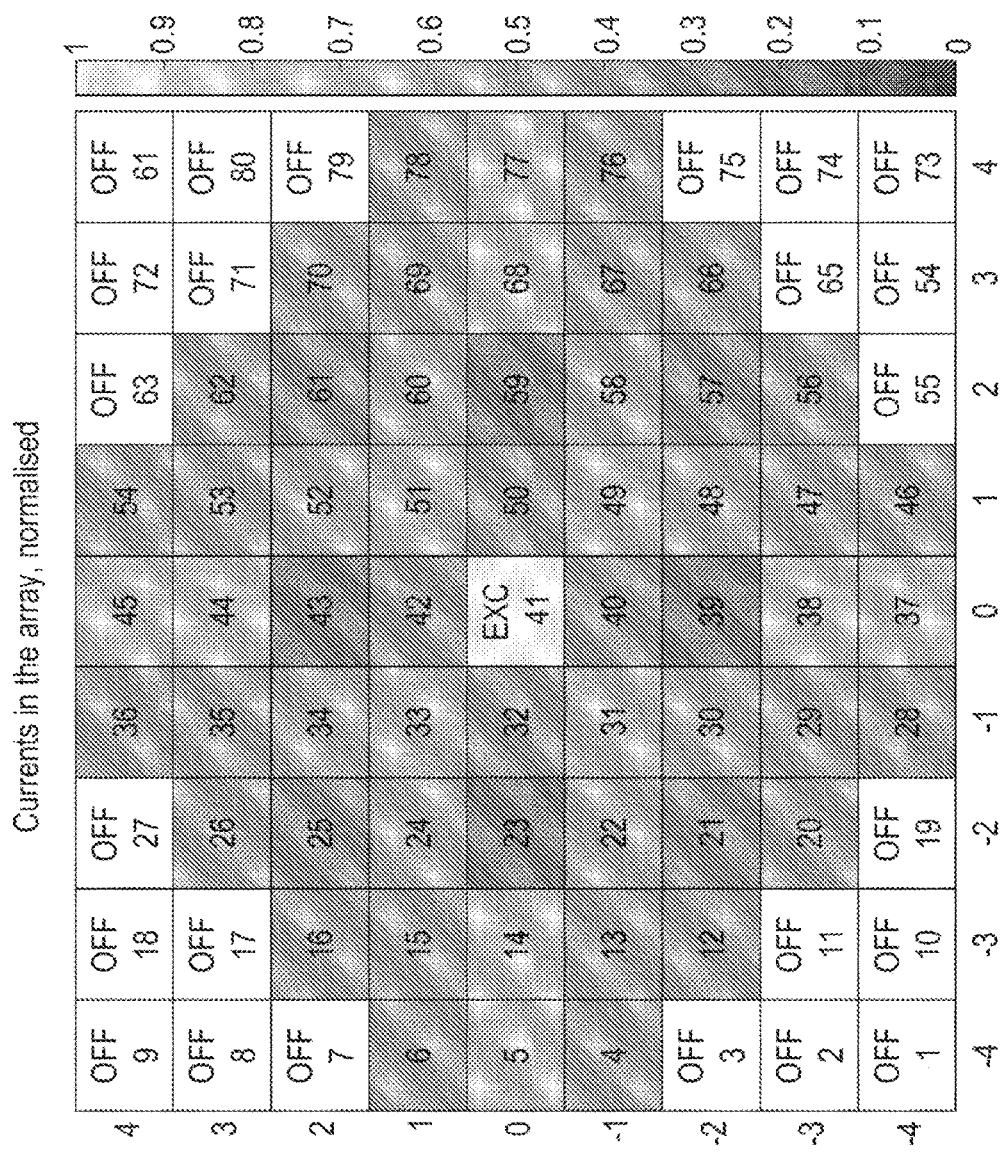
FIG. 22 shows current intensity in a strongly coupled 9×9 array excited at the resonant frequency in which resonators in corner regions are not present or switched off.

Referring to FIGS. 21 and 22, normalised current intensities in a 9×9 array are plotted for a MIW launched from the central element (#41, 'EXC'), which is powered so as to excite a current in that resonator at the resonant frequency $f_r$. In the examples of FIGS. 21 and 22, a triangular set of defects in each corner region is used to cause a checkerboard standing wave pattern in the remaining resonators. Each triangular set of defects comprises six resonators that are turned off (or not present), and has an extent in x and y of three resonators.

FIG. 21 illustrates the current intensities for a weakly coupled array of resonators (in which coupling to non-nearest neighbours is negligible. In practice, an array with coupling between non-nearest neighbours that is 1% or 2% of the coupling between nearest neighbours can be considered negligible, in the sense that it will produce similar results. In FIG. 21 a clear checkerboard pattern of alternating high and low current resonators can be seen.

FIG. 22 illustrates the current intensities for a strongly coupled array of resonators, in which the coupling to the non-nearest neighbour is not negligible. For a strongly coupled array the checkerboard pattern smears out when the resonators are excited at their resonant frequency.

Figure 23:
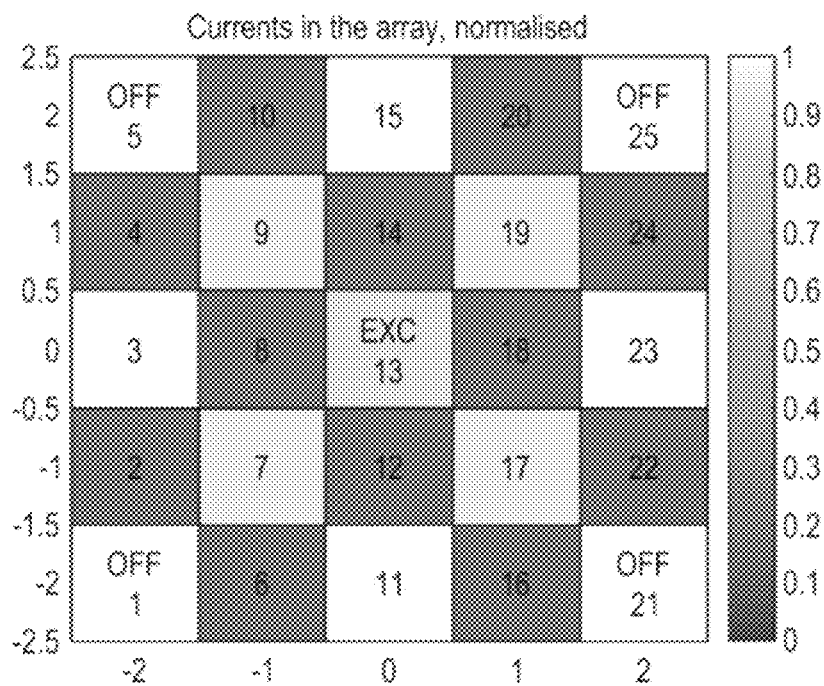
FIG. 23 shows current intensity in a weakly coupled 5×5 array excited at the resonant frequency in which resonators in the corners are not present or switched off.
Figure 24:
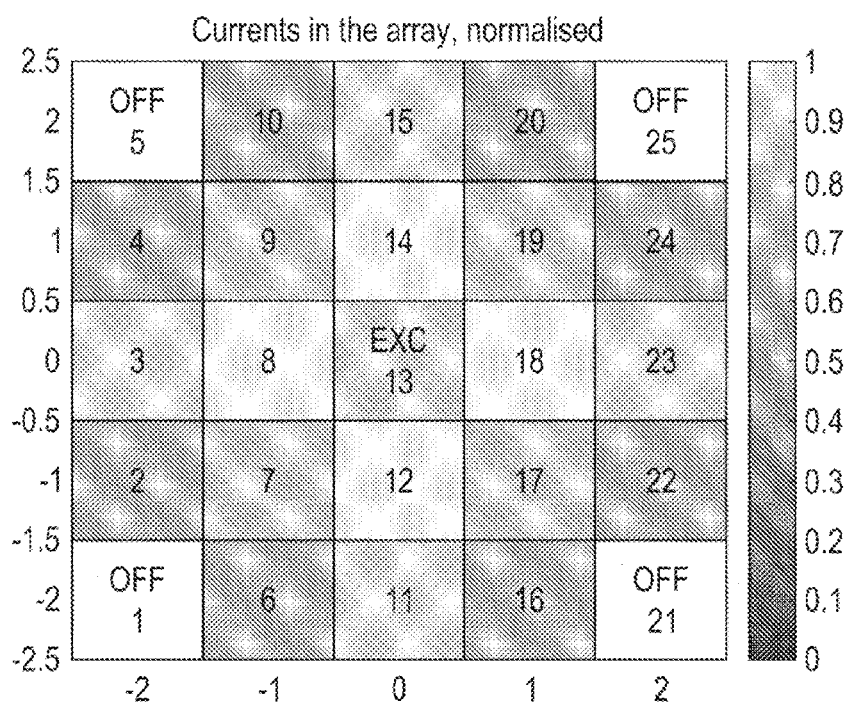
FIG. 24 shows current intensity in a strongly coupled 5×5 array excited at the resonant frequency in which resonators in the corners are not present or switched off.

FIGS. 23 and 24 show a smaller array comprising 5×5 resonators, with each corner having a single resonator defect, excited at the resonant frequency $f_r$, from the central resonator. FIG. 23 shows the weakly coupled case with a clear checkboard pattern, and FIG. 24 shows the strongly coupled case in which the checkerboard pattern is smeared.

Figure 25:
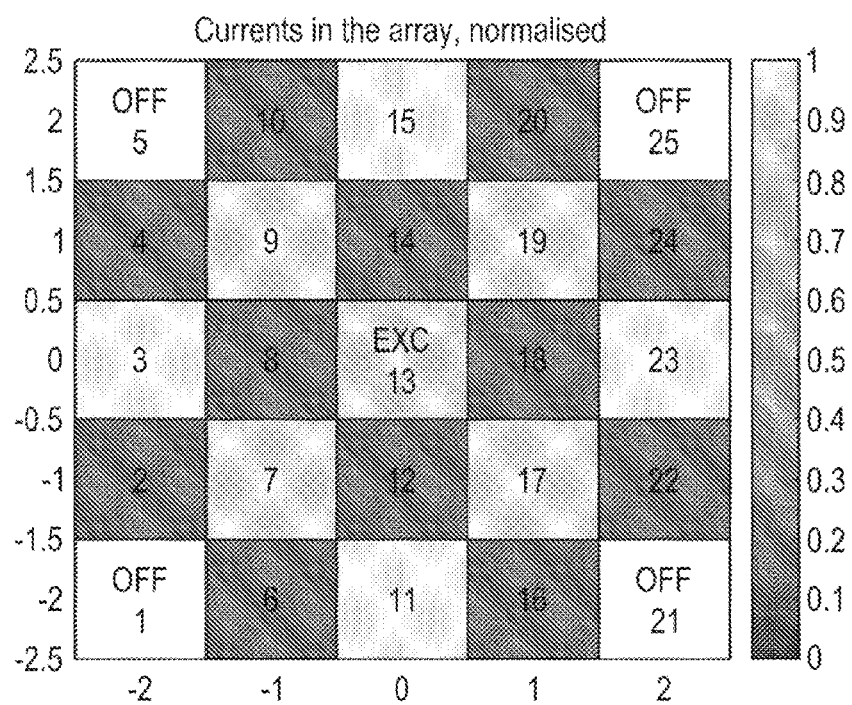
FIG. 25 shows current intensity in a strongly coupled 5×5 array, excited at a frequency approximately 2% less than the resonant frequency, with corner resonators not present or switched off.

A checkerboard excitation pattern can be achieved in a strongly coupled array by exciting the array at a frequency that is different than the resonant frequency $f_r$. FIG. 25 shows a map of current intensity for a 5×5 strongly coupled array, excited by a powered centre resonator at $0.978f_r$. The result is a checkerboard pattern that is very similar to that observed when weakly coupled tiles are excited at their resonant frequency. In general, exciting a metamaterial structure comprising an array of strongly coupled resonators at a frequency that is deviated from the resonant frequency by between 1% and 10% may achieve results similar to the case for a weakly coupled array. More particularly, the use of a frequency that is 2% to 5% lower than the resonant frequency may produce results similar to the weakly coupled case.

Figure 26:
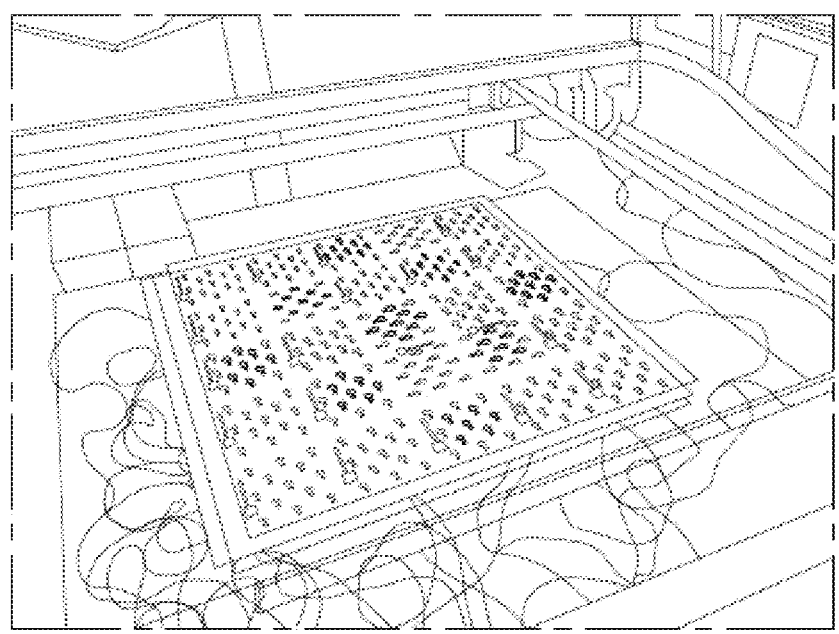
FIG. 26 shows a photograph of an experiment with measurement conditions corresponding with the scenario of FIG. 25.

FIG. 26 shows a photo of current intensities observed in an experiment corresponding with the simulation shown in FIG. 25. A sensor arrangement comprising LEDs that indicate current density in the underlying resonators is used to visualise the current intensity across the array. The results correspond with those shown in FIG. 25. The physical array used for experimental purposes has non-negligible coupling between non-nearest neighbours.

Dynamic Field Patterns Using Temporally Periodic Switching

Dynamic control of standing MIW patterns is possible through periodically-switchable resonators. For example, for the system in FIGS. 23 and 25, one more row of switchable resonators #26 to #30 can be added to the right hand side of the array (adjacent to existing elements #21 to #25). For the purpose of periodic control, resonators #26 and #30 can be permanently switched off or omitted.

In this example, elements #21 and #25 will be switchable elements, as will each of elements #1 to #5. Both resonators #13 and #18 are configured to act as sources. Now, we can periodically control the elements as follows:
 period 1: source #13 on, source #18 off, resonators #2, #3, #4, #6, #10 on, resonators #21, #25, #27, #28, #29 off;
 period 2: source #13 off, source #18 on, resonators #2, #3, #4, #6, #10 off, resonators #21, #25, #27, #28, #29 on.

This alternating between which resonator is driven and which resonators are 'on' will result in a switching chessboard pattern, in which during period 1, odd resonators in the active region of the array are excited with good efficiency, and during period 2, even resonators in the active region of the array are excited with good efficiency. Periodically switching between the first and second period (e.g. with a 1:1 duty cycle) can be used to provide a spatially even distribution of power to the resonators. The rate at which such switching takes place can at any suitable rate: for example up to 10 KHz or as low as a 1 Hz. According to this approach, a device placed anywhere in the central region of the array may receive power with a good efficiency. Using this approach, it may not be necessary to locate a target resonator that provides best coupling to the target device.

Structured Lattice Defects and Lambda-Periodic Defects

This method may be particularly applicable to excitation of MIWs at or near to the resonant frequency of the resonators. At this frequency, the wavelength of the MIWs is equal to four resonators. Lattice defects may be introduced with a spatial period corresponding to the wavelength of the MIWs at the resonant frequency of the resonators. This may be termed a lambda-periodic defects. Such defects may be introduced across the array in a grid pattern (as shown in the example of FIG. 28), or at the edges of the array (as shown in FIG. 27).

The configuration shown in FIGS. 23 to 26 is an example of lambda-periodic defects, which tend to produce checkerboard patterns of intensity in the resonators.

Figure 27:
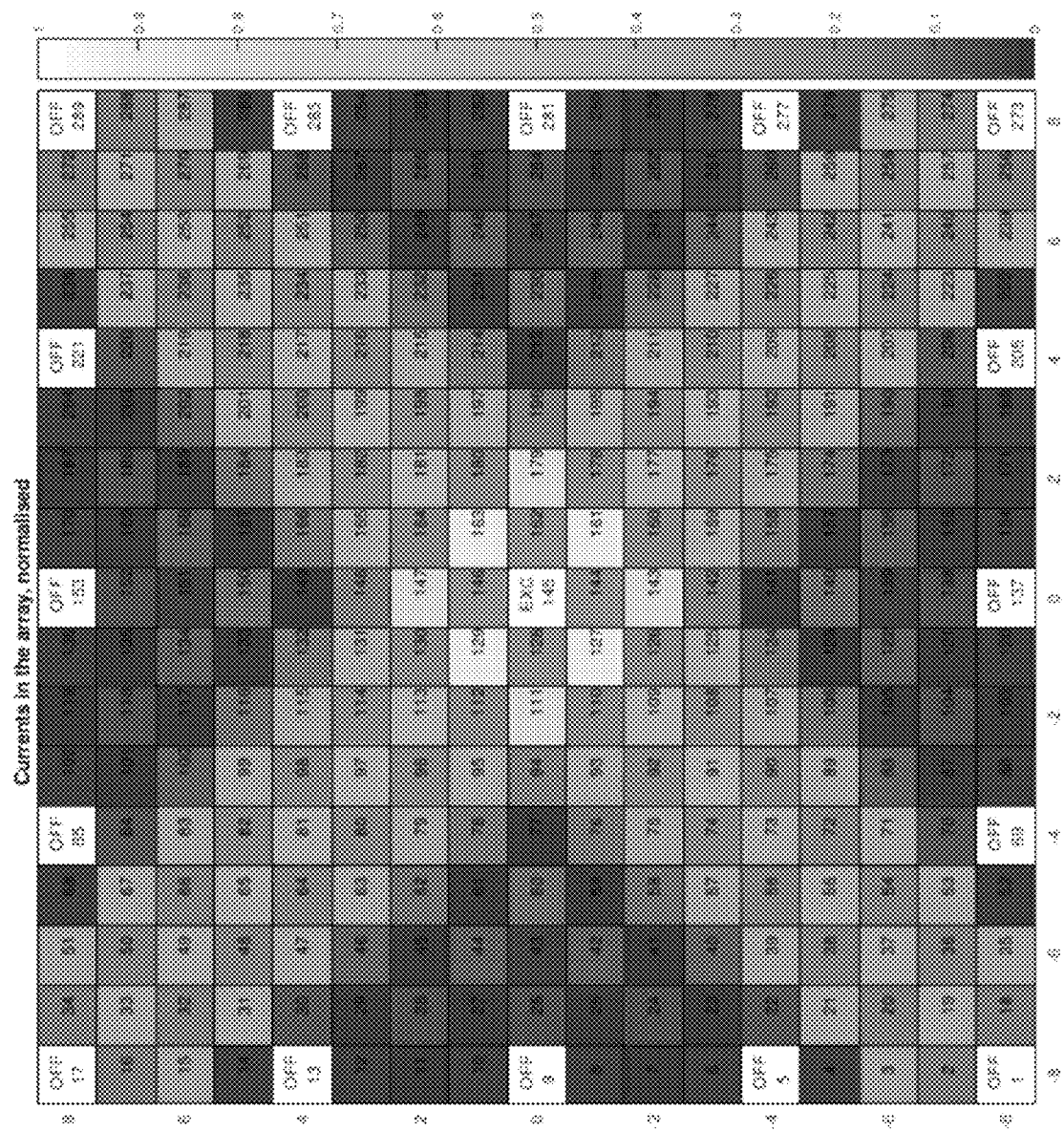
FIG. 27 shows current intensity in a 17×17 array, excited at the resonant frequency, with lambda-periodic defects at the edges.

FIG. 27 shows a 17×17 array of weakly coupled resonators, with the MIW launched from the central element #145 at the resonant frequency $f_r$. This configuration results in a central 3×3 diagonal region (in a checkerboard pattern and oriented at 45 degrees to the array) of resonators with a higher current intensity than in the regions nearer to the margins of the array. A broad diagonal MIW beam of relatively low intensity is created extending from the central region toward the corners of the array.

Figure 28:
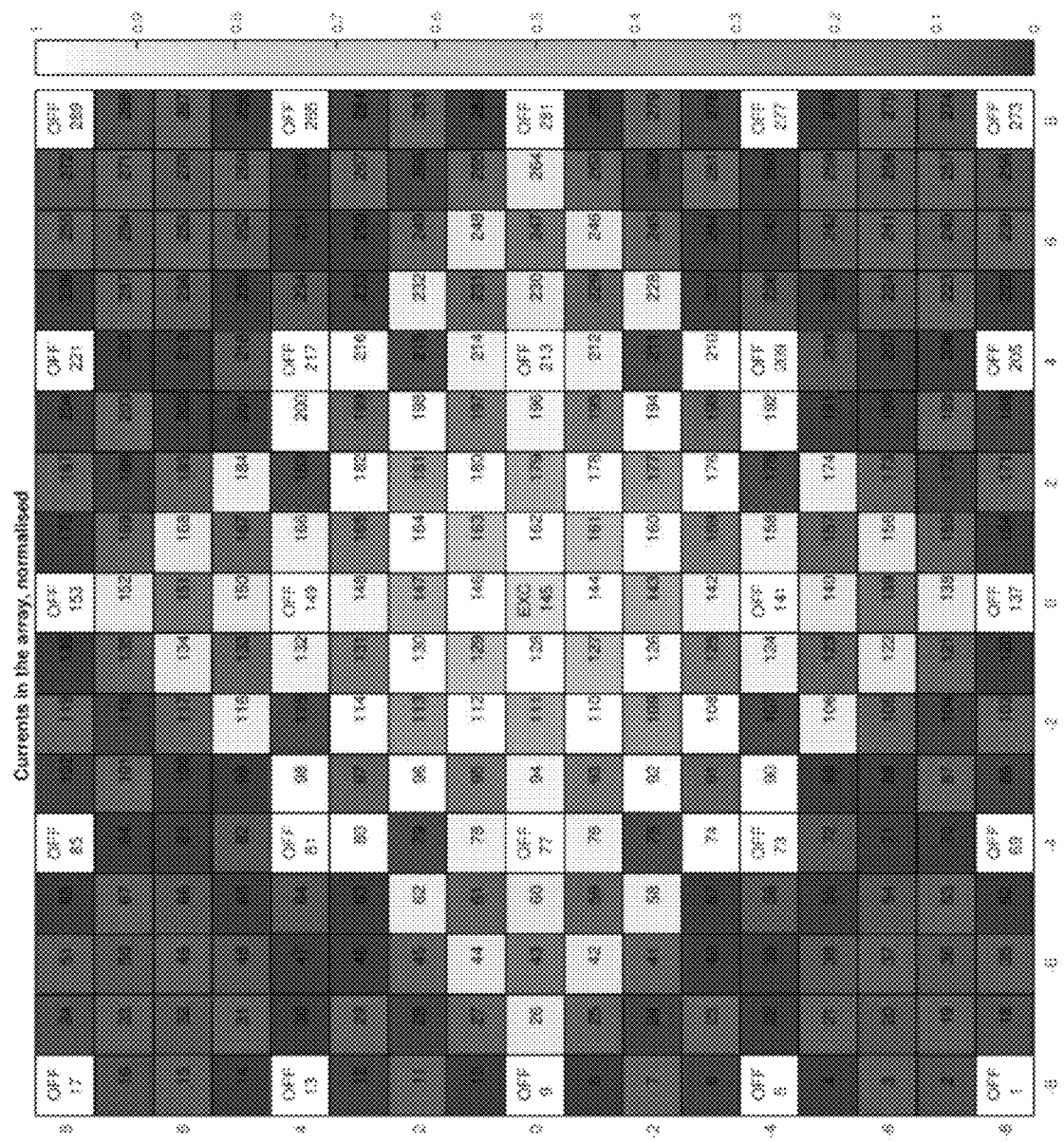
FIG. 28 shows current intensity in a 17×17 array, excited at the resonant frequency, with lambda-grid of defects across the array.

FIG. 28 shows a 17×17 array, similar to that of FIG. 27, except that a lambda-grid of defects is introduced, with every $5^{th}$ resonator in the array switched 'off' (or otherwise removed from participation in the metamaterial). This results in a relatively broad checkerboard pattern (8×8, at 45 degrees to the orientation of the array) of alternating intensity in the central region of the array Pseudo-Uniform Field Profiles in Bi-Atomic Metamaterial Structures Resonators configured as a metamaterial structure capable of supporting MIWs do not have to be identical. As already disclosed above, it possible to create a standing MIW checkerboard pattern of intensity. If even-numbered elements in an array are replaced with geometrically small electrical resonators, the area where wireless power transfer is inefficient as a fraction of the array area can be reduced. The geometrically small elements can be made electrically equivalent to the larger elements. One convenient configuration is octagonal resonators that are geometrically large, with square resonators in the interstices between the octagonal resonators that are small. This approach can be used to provide a relatively uniform efficiency of power transfer across the array.

Figure 36:
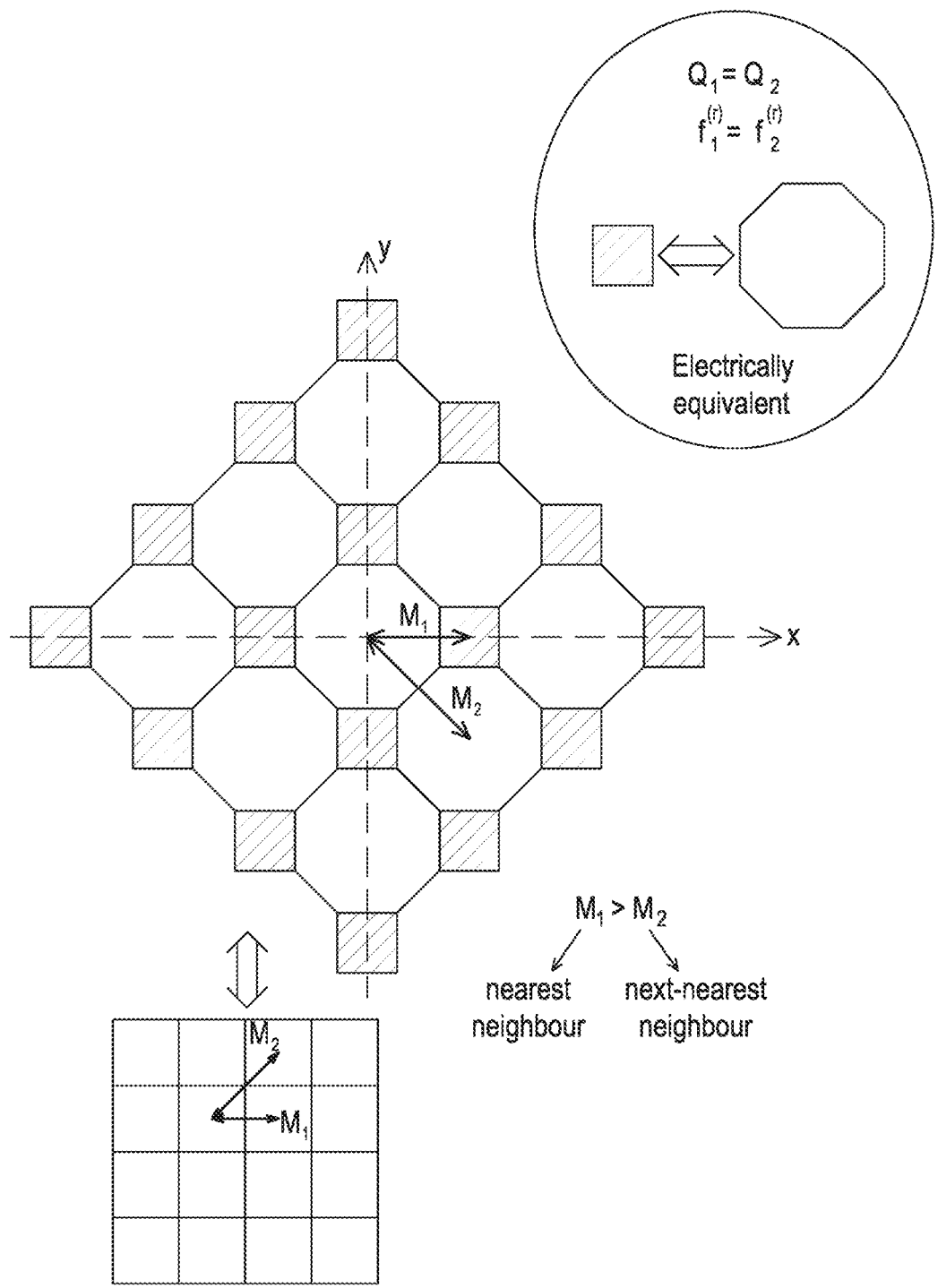
FIG. 36 illustrates a bi-atomic lattice comprising geometrically small square elements, and geometrically large octagonal elements.

FIG. 36 illustrates this concept. The resonators may be designed such that the mutual inductive coupling between adjacent octagonal (or geometrically larger) elements is less than the mutual inductive coupling between each octagonal element and the adjacent square element (i.e. with $M_1 > M_2$). This may be achieved by increasing the separation between conducting tracks of adjacent square resonators (e.g. by using concave track portions that angle or curve away from the neighbouring square element), while minimising the separation between conducting tracks of adjacent regions of square and octagonal resonators. The resonant frequency of the smaller resonators can be made nominally identical to the resonant frequency of the larger resonators.

Controlling MIWs to Generate Hotspots

A set of control methods is disclosed herein comprising manipulation (or adjustment) of resonators in a metamaterial structure, resulting in the generation of high current density (and correspondingly high magnetic field) in certain targeted areas of the structure (in contrast to approximating a uniform pattern throughout the structure). These methods can be employed to maximise power transfer to a target device located in proximity to a particular target resonator, at the same time as minimising energy loss in the rest of the resonators.

Pinball Approach

The intensity pattern in the resonators can be manipulated by controlling MIW scattering on defects in the lattice. Defects may be introduced using controllable elements, as described herein. As shown in FIG. 16 (and FIG. 30), MIWs at the resonant frequency $f_r$ tend to form diagonal beams in the lattice. In more general terms, beams will tend to form along axes of symmetry of the Brillouin scattering zone of the metamaterial. Placing a defect in the path of an MIW beam will result in scattering of the beam and potentially reflection from the edges of the array. Where such MIW beams cross, there may be constructive interference. Scattering and reflecting defects can therefore be used to increase current intensity at specific locations in the array.

Figure 29:
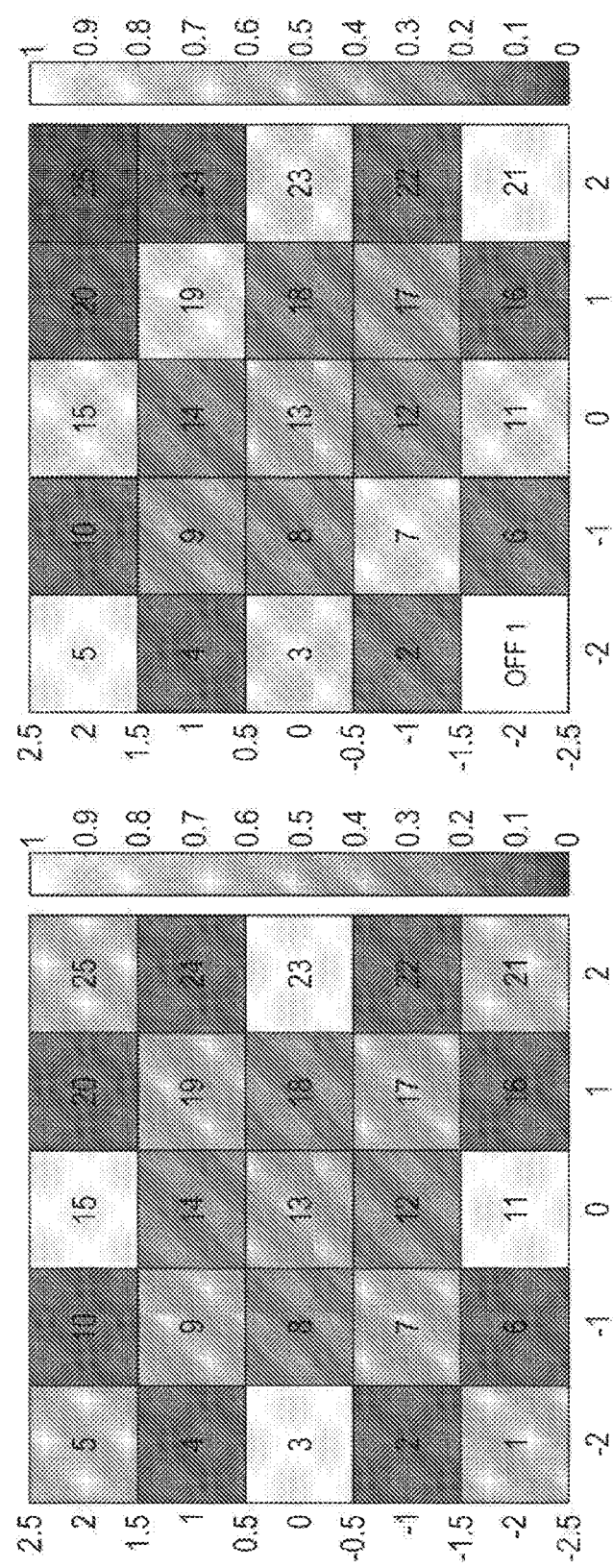
FIG. 29 shows current intensity in a 5×5 array of resonators, excited at the resonant frequency with (left) no defects and (right) a single defect in the top-right corner.

FIG. 29 shows a 5×5 array of resonators in which power is injected at the central resonator at the resonant frequency $f_r$. The current intensities are shown normalised to the maximum in the array. On the left hand side of FIG. 29, the resonators with maximum current are those at the centre of the edges of the array: #3, #11, #15 and #23. On the right hand side, a defect is introduced in the bottom-left corner of the array, at resonator #1. This defect changes the intensity pattern in the array, so that the NW and SE corners, #5 and #21 have maximum current intensity.

Figure 30:
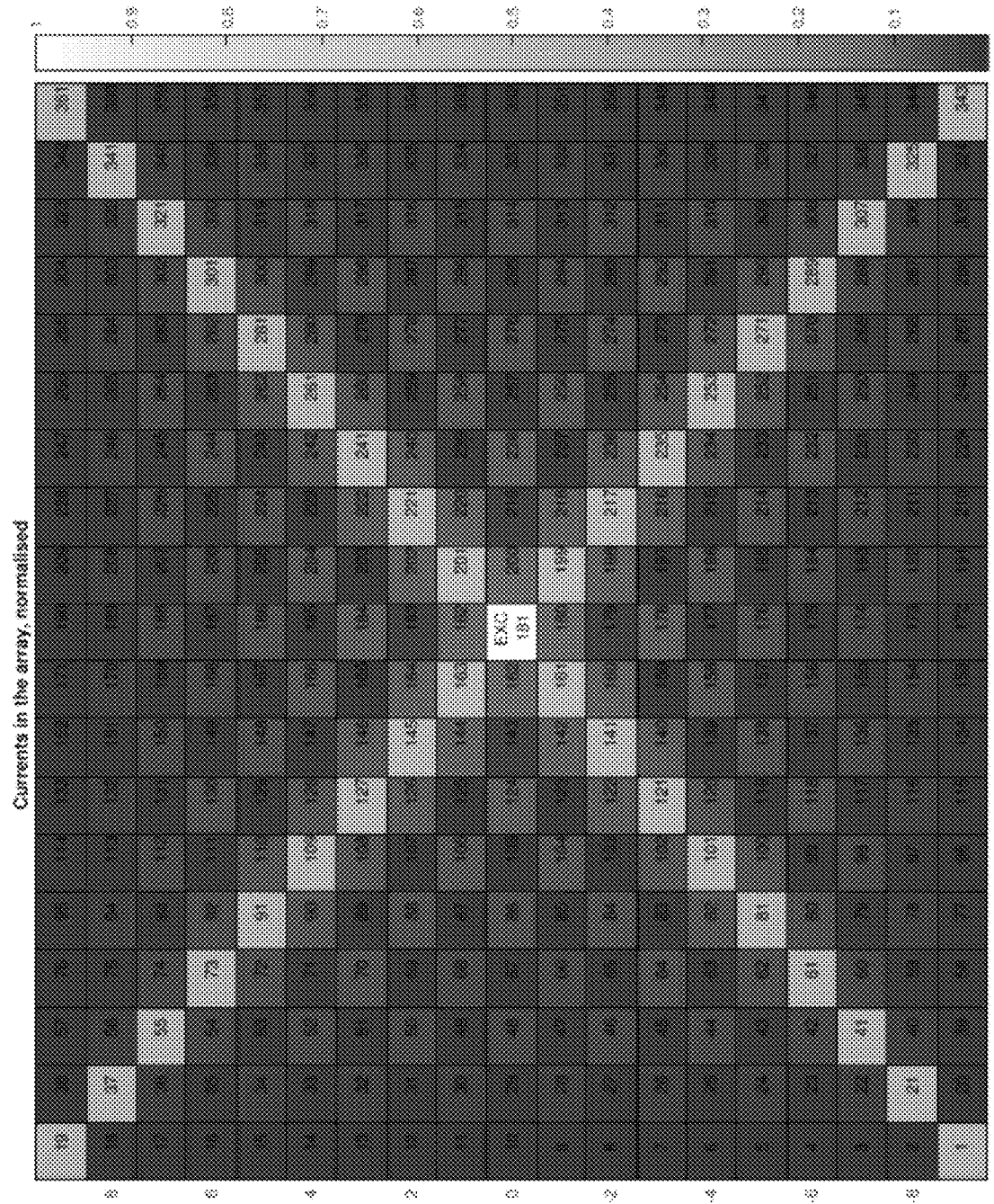
FIG. 30 shows current intensity in a 19×19 array of resonators, excited at the resonant frequency with no defects, illustrating diagonal beaming in the metamaterial.
Figure 31:
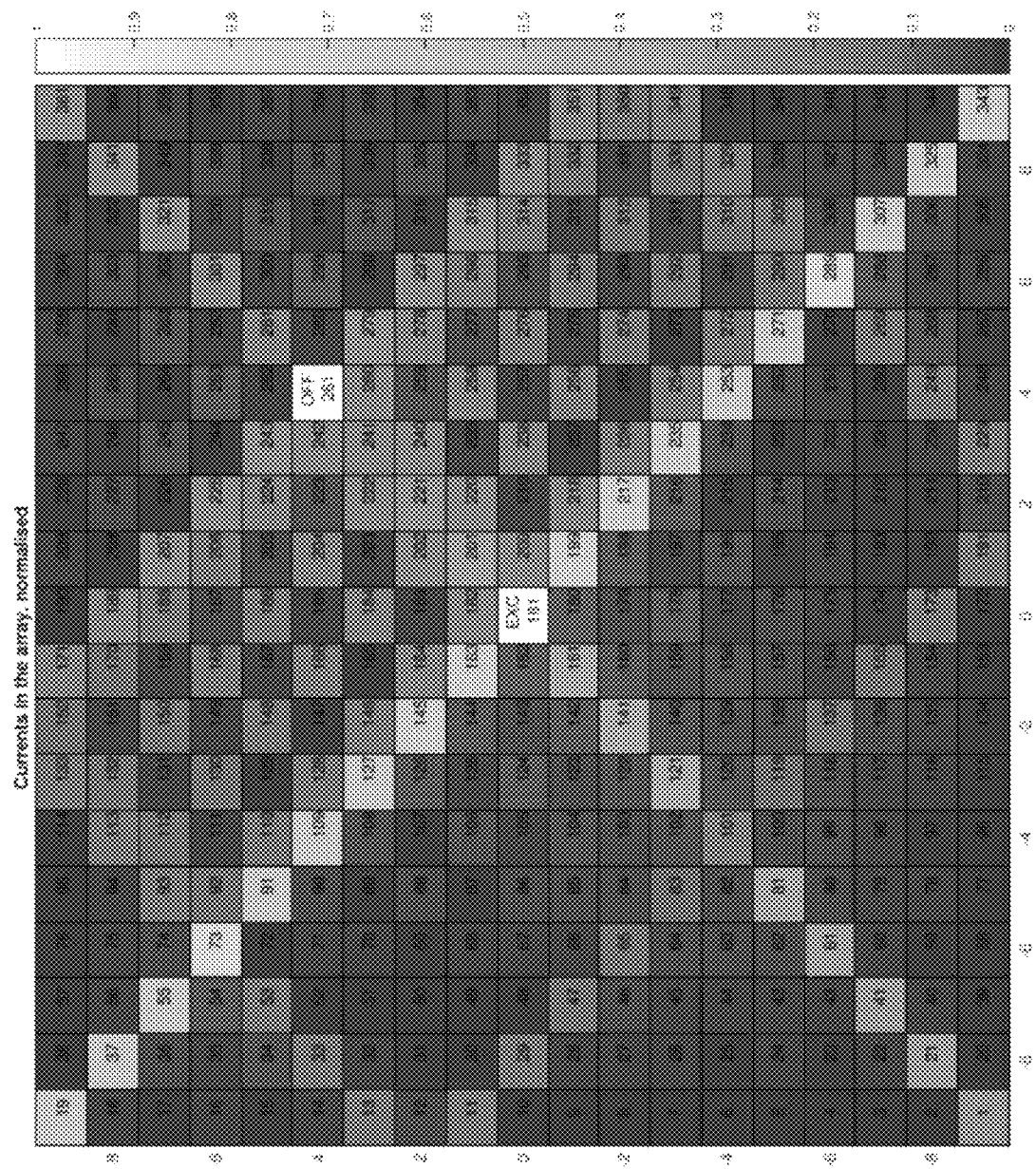
FIG. 31 shows the effect of introducing a defect along one of the diagonal beams in FIG. 30.

FIGS. 30 and 31 illustrate the same sort of defect scattering (or pinballing) effect in a larger 19×19 array. In these examples the array is again excited by a powered central resonator (#41). In FIG. 30 diagonal beams form, extending toward the corners of the array from the powered central resonator. In FIG. 31, a single defect is introduced by switching the resonator #261 'off' which is in the path of the NE beam. The resulting scattering produces constructive interference at elements #73 and #289.

Holographic Borders

Controlling the defects at the edges of the array can be used to manipulate reflections from the edges. By changing the reflection profile from the edges/borders of the array, it is possible to re-direct MIW beams to create power-transfer 'hot-spots' in desired locations in the array. This is illustrated in FIGS. 32 and 33.

Figure 32:
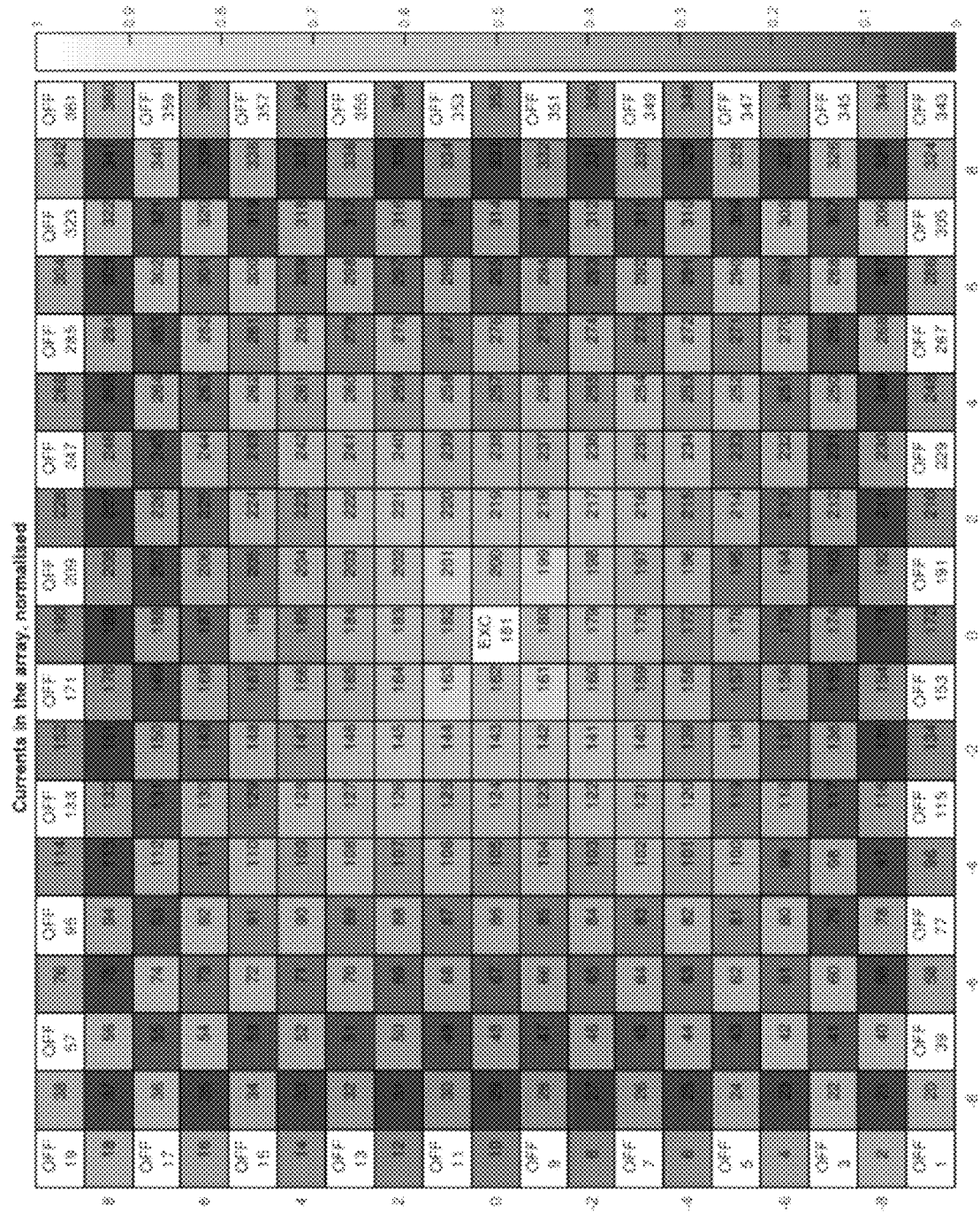
FIG. 32 shows current intensity in a 19×19 array of resonators, excited at the resonant frequency by the central resonator, in which every second resonator at the edge is in the off state (or not present)

FIG. 32 illustrates a 19×19 array in which every second tile along the edge is switched off (or not present), in which there are no scattering defects in the central region of the array. The array is excited at the resonant frequency by a powered resonator at the centre of the array (#181). The defects at the edges result in a more even distribution of current intensity in the array compared with the situation shown in FIG. 30—the MIW beams are dispersed and distributed around the array by the defects at the borders.

Figure 33:
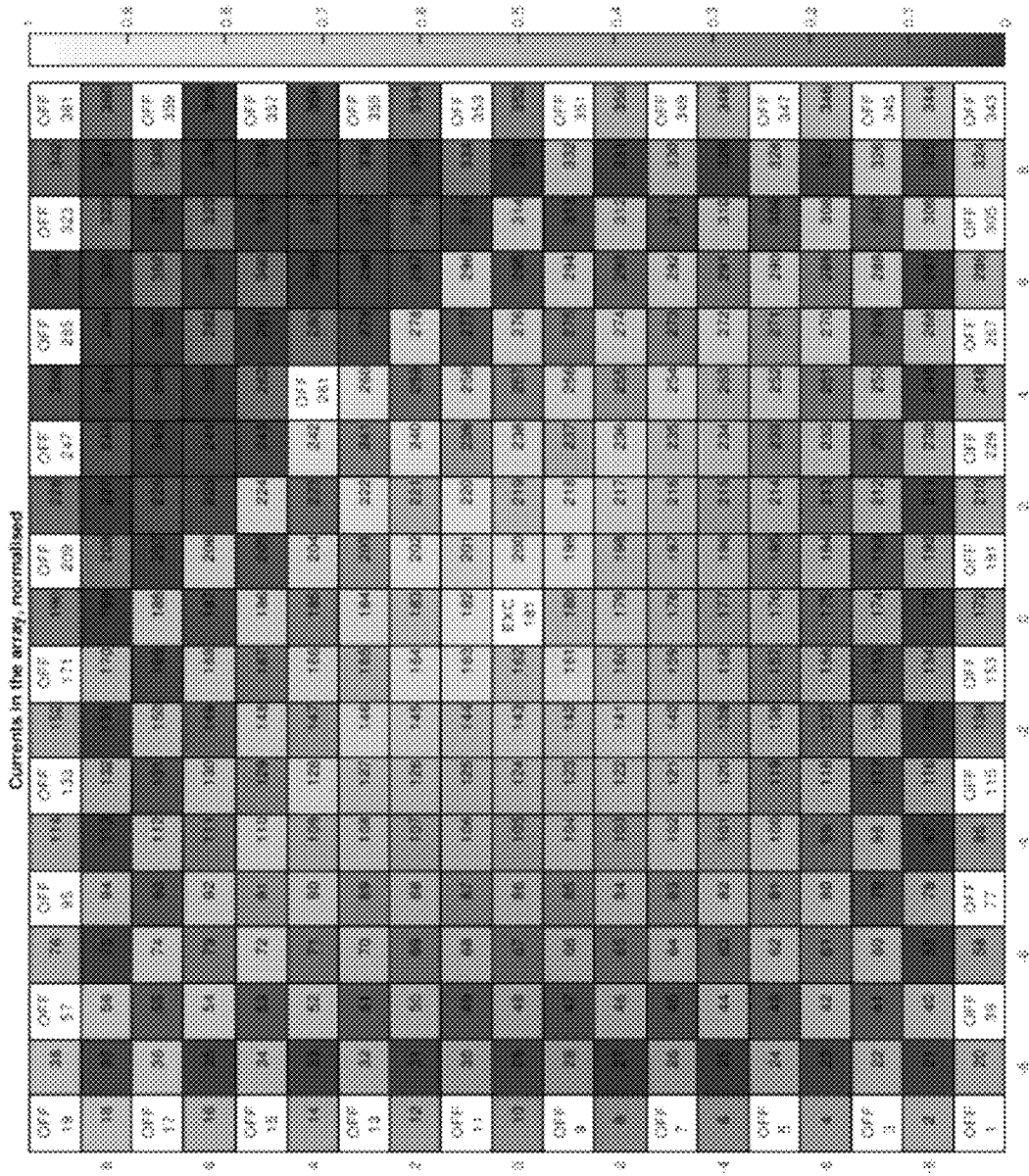
FIG. 33 shows the effect, starting from the scenario of FIG. 32, of introducing a defect at the same location as in the example of FIG. 31.

FIG. 33 illustrates the same 19×19 array as shown in FIG. 32, but in which a single defect it introduced at resonator #261. This results in a reflection and scattering from the single defect, in combination with the border effect shown. The current density in a number of locations (e.g. #242, #260, #222, #202) is increased by the scattering/reflection from the defect at #261. Resonators NE of the defect (at #261) tend to have reduced current density and the energy in this region is redistributed to the other resonators.

Excitation Control

The location, frequency and relative phase of power injection can be used to control the distribution of current density in the array. FIGS. 23 to 25 illustrate the effect of changing the resonant frequency.

Figure 34:
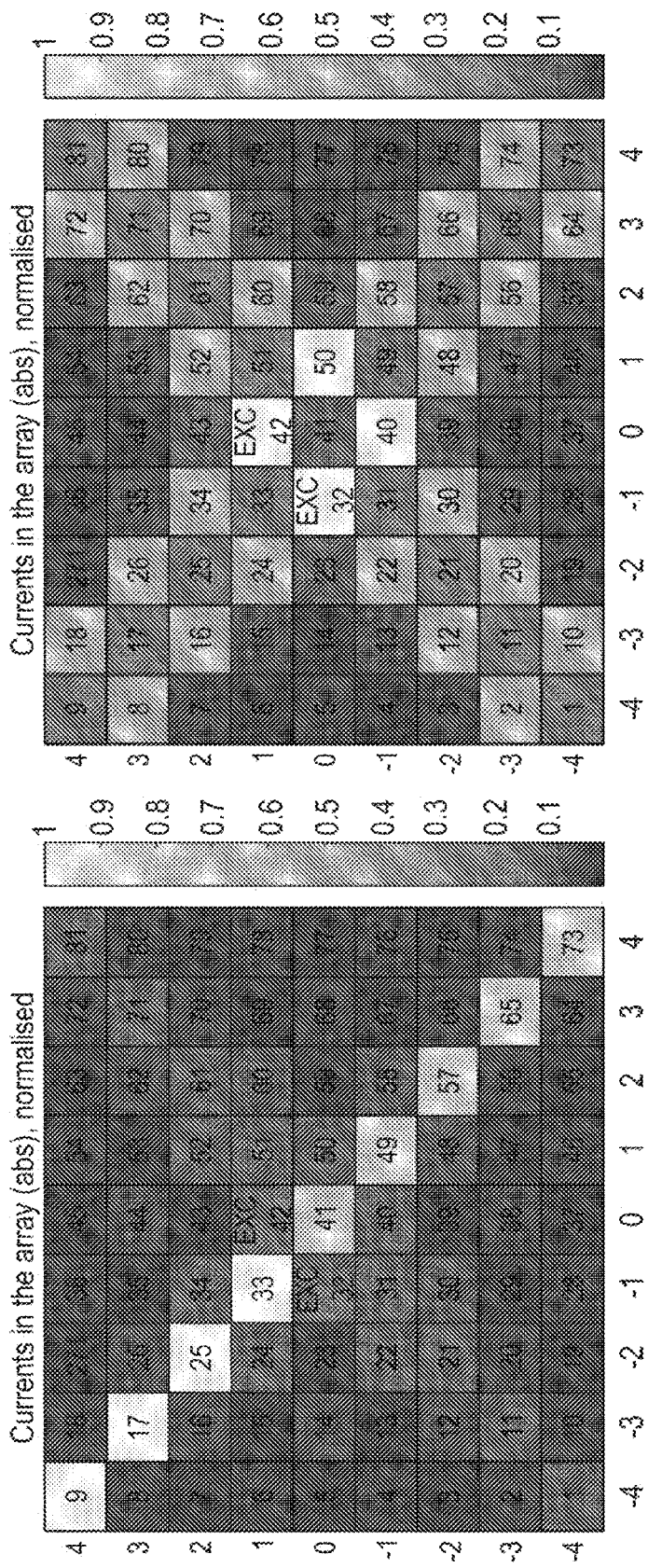
FIG. 34 shows current intensity in a 9×9 array of resonators, with power injected at the resonant frequency at two central resonators, in-phase (left) and out of phase (right)

FIG. 34 shows a 9×9 array of resonators, with power injected at the resonant frequency $f_r$ at resonators #32 and #42, one resonator W and N of the central resonator (#41) respectively. On the left of FIG. 34 the excitation signals are in phase. On the right of FIG. 34, the excitation signals have a 180 degree phase difference. The in phase excitation from these positions results in a diagonal NW to SE beam across the centre of the array. The out of phase excitation from these positions results in a symmetric diagonal pattern of excitation across the array.

It may be useful to place power injection resonators at the border of the array.

Quasi-1D Channels in Metasurfaces

A quasi-1D channel can be created in a metamaterial substrate by activating only a 1-dimensional path of resonators between the source (powered) resonator and the target resonator, which receives power. Power transfer may take place in more than one direction from a powered resonator.

Figure 35:
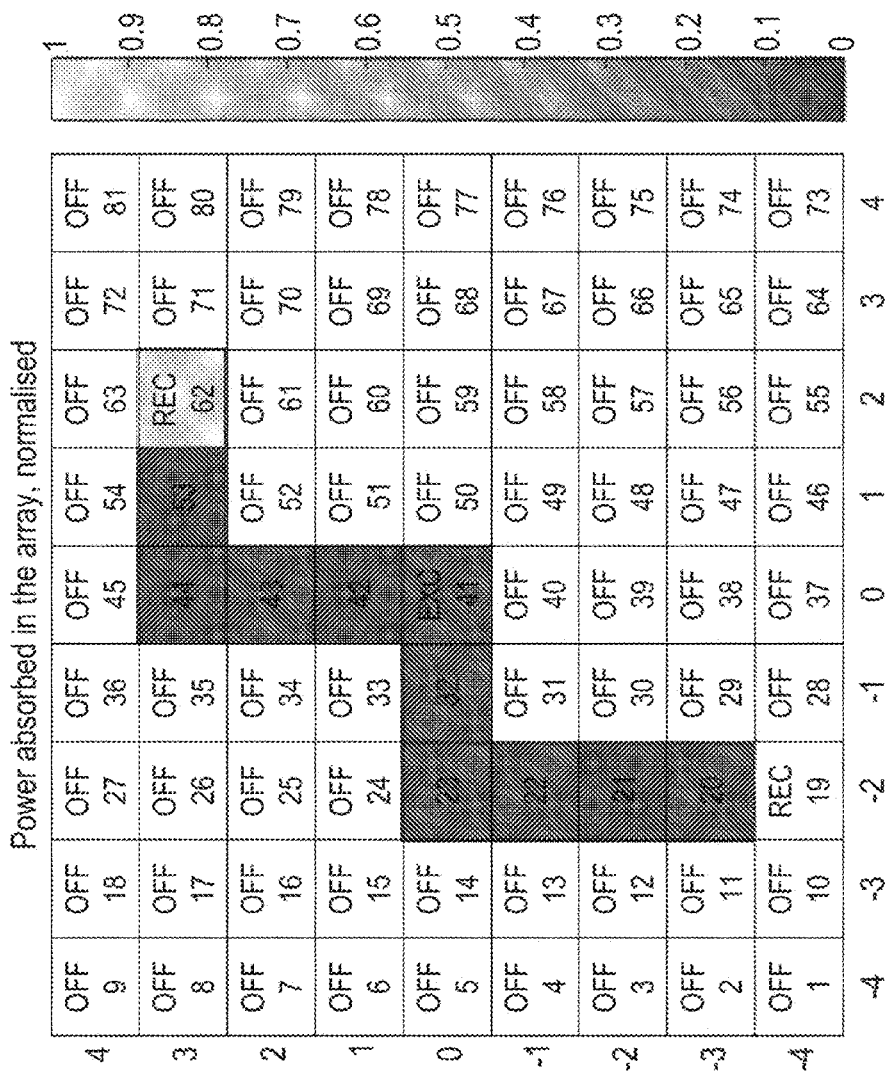
FIG. 35 shows normalised power dissipated in a quasi-1D channel feeding two target loads from a central excitation location.

FIG. 35 shows a 9×9 array of resonators, in which power is injected at the central resonator #41 at the resonant frequency. Tiles are selectively switched on to form a direct path along nearest neighbours between the powered resonator and two target resonators, #19 and #62, each of which include a 10 ohm load. Rather than current intensity, FIG. 35 shows normalised power dissipated in the array.

If the receiver device presents a load that is strongly mismatched with the power-transmitting array, reflections may occur from the receiver device, resulting in less efficient power transfer. One way to improve impedance matching where this situation arises may be to add redundant spurs to the quasi-1D channel, which will change the effective impedance of the quasi 1D channel of the power transmitting array, and may improve matching with the receiver.

In some embodiments one or more elements may be provided with a communication system for interface with devices external to the system. The communication may (as already mentioned above) comprise a Bluetooth, Wifi or Zigbee system, or a wired connection such as Ethernet and USB.

It will be understood that each example of functionality for an element is not exclusive with other functionalities—a single element may comprise any or all of the functionalities described herein (e.g. a display element with a sensor, etc.). Furthermore each functionality described above may be implemented on a stackable tile, that is brought into communication and power coupling with the power transferring primary resonator by stacking the respective tile on the tile carrying the primary resonator.

With such an arrangement a modular system of tiles is possible. A power transmission medium can be constructed from simple power transfer elements, which may include only passive components, and which each include a primary resonator for transmitting magnetoinductive waves. Each power transfer element can be augmented by the addition of further tiles in a stacked configuration. A subset of the power transmission elements can be converted into a controllable elements by the addition of a controllable secondary resonator stacked with the primary resonator. A subset of the power transmission elements can be converted into power monitoring elements, for detecting and locating a target device drawing power from the system. The data from power monitoring elements may be used by a system controller to control the controllable elements so as to dynamically optimise power transfer through the system. At least some of the elements may be able to provide power to a target device that requires a different wireless power transfer standard, using a power converter and output inductive loop (which may also be provided in a stacked configuration with the basic power transfer element).

Although embodiments with separate substrates (or tiles) have been described, it is also possible to create a single substrate that includes an input element and a plurality of power transfer elements (i.e. with the resonators all on a single substrate).

Although specific embodiments have been described, variations are possible which are intentionally within the scope of the accompanying claims.

The invention claimed is:

1. A method of transferring power or data or signals through a plurality of electrical resonators that support waves of inter-element excitation comprising waves of current induced in each resonator or magnetoinductive waves, MIWs, to wirelessly transmit power or data or signals to a receiver located adjacent to one or more target resonators of the plurality of electrical resonators, the method comprising locating the target resonator or resonators by determining which electrical resonator or resonators have the best coupling to a target device comprising the receiver placed in proximity to the plurality of electrical resonators; wherein the method comprises placing a first sub-set of the plurality of electrical resonators in an 'off' state and a second sub-set of the plurality of electrical resonators in an 'on' state, and determining that the target resonator or resonators are located closest to a resonator in the first sub-set of electrical resonators if the target device is receiving power from the plurality of electrical resonators.

2. The method of claim 1, comprising configuring a metamaterial or multi-element structure comprising the plurality of electrical resonators, the method comprising:
   injecting power into the structure by powering at least one of the electrical resonators with an alternating current; and
   adjusting parameters of the metamaterial or multi-element structure to create constructive interference of waves of inter-element excitation comprising waves of current induced in each resonator or MIWs at the target resonator or resonators of the electrical resonators, to improve power or data or signal transfer from the at least one powered electrical resonator to the target resonator or resonators.

3. The method of claim 2, comprising using a model to simulate the propagation of waves of inter-element excitation comprising waves of current induced in each resonator or MIWs in the structure to determine how to adjust the parameters of the metamaterial or multi-element structure to improve power or data or signal transfer.

4. The method of claim 3, comprising using the model to determine how to increase current flow at the target resonator or resonators once the target resonator or resonators have been identified.

5. The method of claim 1, wherein locating the target resonator or resonators comprises:
   establishing a communication channel between a system controller and the target device;
   receiving information from the target device about whether the target device is receiving power or data or signals from the plurality of electrical resonators; and
   conducting a search for the target device by adjusting parameters of the plurality of electrical resonators to vary the distribution of current(s) therein, while monitoring the received power or data or signals at the target device.

6. The method of claim 1, wherein at least one of the electrical resonators is a controllable resonator that comprises part of a controllable element, the controllable element further comprising a control device.

7. The method of claim 6, wherein the control device comprises an active control component that is configured to adjust the effective impedance or resonance frequency of the controllable resonator in response to a control signal.

8. The method of claim 1, comprising monitoring input impedance or reflection properties of at least one powered electrical resonator of the plurality of electrical resonators to locate the target device.

9. The method of claim 1, comprising converting a subset of the electrical resonators into power monitoring elements for detecting and locating a target device drawing power from the plurality of electrical resonators.

10. An apparatus comprising:
    a plurality of electrical resonators that are configurable to support waves of inter-element excitation comprising waves of current induced in each resonator or magnetoinductive waves, MIWs, to wirelessly transmit power or data or signals to a receiver located adjacent to one or more target resonators of the plurality of electrical resonators;
    a power source for powering at least one of the electrical resonators; and
    a system controller configured to locate one or more target resonators of the plurality of electrical resonators by determining which electrical resonator or resonators have the best coupling to a target device comprising the receiver placed in proximity to the plurality of electrical resonators;
    wherein the system controller is configured to place a first sub-set of the plurality of electrical resonators in an 'off' state and a second sub-set of the electrical plurality of resonators in an 'on' state, and determine that the target resonator or resonators are in the first sub-set of electrical resonators if the target device is receiving power from the plurality of electrical resonators.

11. The apparatus of claim 10, wherein:
    the plurality of electrical resonators is configured as a metamaterial or multi-element structure;
    the power source is configured to inject power into the structure by powering at least one of the electrical resonators with an alternating current; and
    the system controller is configured to adjust parameters of the metamaterial or multi-element structure to create constructive interference of waves of inter-element excitation comprising waves of current induced in each resonator or MIWs at the target resonator or resonators of the electrical resonators, to improve power or data or signal transfer from the at least one powered electrical resonator to the target resonator or resonators.

12. The apparatus of claim 11, wherein the system controller is configured to use a model to simulate the propagation of waves of inter-element excitation comprising waves of current induced in each resonator or MIWs in the structure to determine how to adjust the parameters of the metamaterial or multi-element structure to improve power or data or signal transfer.

13. The apparatus of claim 12, wherein the system controller is configured to use the model to determine how to increase current flow at the target resonator or resonators once the target resonator or resonators have been identified.

14. The apparatus of claim 11, wherein locating the target resonator comprises:
    establishing a communication channel between a system controller and the target device;
    receiving information from the target device about whether the target device is receiving power or data or signals from the plurality of electrical resonators; and
    conducting a search for the target device by adjusting parameters of the plurality of electrical resonators to vary the distribution of current(s) therein, while monitoring the received power or data or signals at the target device.

15. The apparatus of claim 11, wherein at least one of the electrical resonators is a controllable resonator that comprises part of a controllable element, the controllable element further comprising a control device.

16. The apparatus of claim 15, wherein the control device comprises an active control component that is configured to adjust the effective impedance or resonance frequency of the controllable resonator in response to a control signal.

17. The apparatus of claim 11, wherein the system controller is configured to monitor an input impedance or reflection properties of at least one powered electrical resonator of the plurality of electrical resonators to locate the target device.

18. The apparatus of claim 11, wherein the system controller is configured to convert a subset of the electrical resonators into power monitoring elements for detecting and locating a target device drawing power from the plurality of electrical resonators.

* * * * *